United States Patent
Han et al.

(10) Patent No.: US 12,155,542 B2
(45) Date of Patent: Nov. 26, 2024

(54) METHOD AND APPARATUS FOR TRANSMITTING OR RECEIVING DATA PACKET IN WIRELESS COMMUNICATION SYSTEM

(71) Applicants: SAMSUNG ELECTRONICS CO., LTD., Suwon-si (KR); KOREA UNIVERSITY RESEARCH AND BUSINESS FOUNDATION, Seoul (KR)

(72) Inventors: Yoonseon Han, Suwon-si (KR); Jungje Son, Suwon-si (KR); Joonwoo Kim, Seoul (KR); Sangheon Pack, Seoul (KR); Jaewook Lee, Seoul (KR); Yujin Tae, Seoul (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 17/754,755

(22) PCT Filed: Sep. 28, 2020

(86) PCT No.: PCT/KR2020/013180
§ 371 (c)(1),
(2) Date: Apr. 11, 2022

(87) PCT Pub. No.: WO2021/075762
PCT Pub. Date: Apr. 22, 2021

(65) Prior Publication Data
US 2024/0031256 A1 Jan. 25, 2024

(30) Foreign Application Priority Data
Oct. 14, 2019 (KR) .................... 10-2019-0127165

(51) Int. Cl.
*H04L 43/028* (2022.01)
*H04L 41/0806* (2022.01)
(Continued)

(52) U.S. Cl.
CPC ........ *H04L 43/028* (2013.01); *H04L 41/0806* (2013.01); *H04L 45/24* (2013.01); *H04L 61/2528* (2013.01)

(58) Field of Classification Search
CPC ... H04L 43/028; H04L 41/0806; H04L 45/24; H04L 61/2528; H04L 67/56;
(Continued)

(56) References Cited

U.S. PATENT DOCUMENTS 10,412,588 B1 * 9/2019 Anandan ................ H04W 8/20
10,531,420 B2  1/2020 Li et al.
(Continued)

FOREIGN PATENT DOCUMENTS

KR    20140102985 A    8/2014
KR    10-2016-0072583 A    6/2016
(Continued)

OTHER PUBLICATIONS

International Search Report and Written Opinion of the International Searching Authority in connection with International Application No. PCT/KR2020/013180 issued Dec. 21, 2020, 17, pages.
(Continued)

*Primary Examiner* — Dhairya A Patel
*Assistant Examiner* — Alex H. Tran

(57) ABSTRACT

Provided are a method and apparatus for transmitting and receiving a data packet in a wireless communication system, the method including: provisioning at least one virtual network function (VNF) corresponding to some or all of a plurality of network functions (NFs) included in a first core network; registering, in the first core network, the provi-
(Continued)

sioned at least one VNF; receiving a first packet from a user equipment (UE) and determining a path through which the first packet is to be transmitted, from among a first path between a user plane function (UPF) of the first core network and an electronic device and a second path between a UPF of a second core network and the electronic device; and transmitting the first packet through the determined path.

11 Claims, 22 Drawing Sheets

(51) Int. Cl.
*H04L 45/24* (2022.01)
*H04L 61/2521* (2022.01)

(58) Field of Classification Search
CPC ....... H04L 63/0281; H04L 9/40; H04L 41/40; H04L 41/342; H04W 84/042; H04W 12/02; H04W 12/08; H04W 12/06
See application file for complete search history.

(56) References Cited

U.S. PATENT DOCUMENTS

| | | | |
|---|---|---|---|
| 10,779,254 B2 | 9/2020 | Lee et al. | |
| 11,096,046 B2* | 8/2021 | Li | H04W 36/14 |
| 11,456,989 B2* | 9/2022 | Bagwell | H04L 63/0272 |
| 11,503,531 B2* | 11/2022 | Xu | H04W 28/0278 |
| 11,528,328 B2* | 12/2022 | Kahn | H04L 67/142 |
| 2018/0124175 A1* | 5/2018 | Li | G06F 16/22 |
| 2018/0199398 A1* | 7/2018 | Dao | H04L 67/14 |
| 2019/0182875 A1 | 6/2019 | Talebi Fard et al. | |
| 2019/0182895 A1* | 6/2019 | Di Girolamo | H04L 63/0892 |
| 2020/0178062 A1* | 6/2020 | Bartolomé Rodrigo | H04W 60/04 |
| 2021/0298104 A1* | 9/2021 | Akiyoshi | H04W 76/16 |
| 2021/0410057 A1* | 12/2021 | Abtin | H04L 41/5058 |

FOREIGN PATENT DOCUMENTS

| | | |
|---|---|---|
| KR | 20160072583 A | 6/2016 |
| KR | 10-2019-0019005 A | 2/2019 |
| KR | 20190019005 A | 2/2019 |
| KR | 10-2019-0044661 A | 4/2019 |
| KR | 20190044661 A | 4/2019 |

OTHER PUBLICATIONS

Moradi et al., "SkyCore: Moving Core to the Edge for Untethered and Reliable UAV-based LTE Networks" Oct. 2018, MobiCom '18, New Delhi, India, 16 pages.
Mandalari, et al., "Experience: Implications of Roaming in Europe" MobiCom'18, Oct. 29-Nov. 2, 2018, New Delhi, India, 11 pages.
3GPP TS 23.501 V16.1.0 (Jun. 2019); Technical Specification; 3rd Generation Partnership Project; Technical Specification Group Services and System Aspects; System Architecture for the 5G System; Stage 2 (Release 16); 367 pages.
ARS Technica, "BIZ & IT—Hola VPN used to perform DDOS attacks, violate user privacy" Jun. 1, 2015, 6 pages.
Russell, "Popular crypto service MyEtherWallet hit by attack after Hola VPN gets hacked" published Jul. 10, 2018 on TechCrunch, 10 pages.
AT&T, "Flying COW Connects Puerto Rico" published Nov. 6, 2017 on AT&T Inside Connections, 6 pages.
Goovaerts, "Verizon Continues Tests Using Drones for LTE Coverage" published Apr. 11, 2017 on 5G Technology World, 7 pages.
International Search Report and Written Opinion of the International Searching Authority in connection with International Application No. PCT/KR2020/013180 issued Dec. 21, 2020, 11 pages.
3GPP TS 23.501 V16.1.0 (Jun. 2019); Technical Specification; 3rd Generation Partnership Project; Technical Specification Group Services and System Aspects; System Architecture for the 5G System; Stage 2 (Release 16); 368 pages.
Office Action issued Jan. 26, 2024, in connection with Korean Patent Application No. 10-2019-0127165, 134 pages.

* cited by examiner

METHOD AND APPARATUS FOR TRANSMITTING OR RECEIVING DATA PACKET IN WIRELESS COMMUNICATION SYSTEM

CROSS-REFERENCE TO RELATED APPLICATIONS

This application is a 371 of International Application No. PCT/KR2020/013180, filed Sep. 28, 2020, which claims priority to Korean Patent Application No. 10-2019-0127165, filed Oct. 14, 2019, the disclosures of which are herein incorporated by reference in their entirety

BACKGROUND

1. Field

Embodiments of the present disclosure relate to a method and apparatus for transmitting and receiving a data packet in a wireless communication system.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why 5G communication systems or pre-5G communication systems are called beyond 4G network communication systems or post long-term evolution (LTE) systems. The 5G communication system defined in 3GPP is referred to as a new radio (NR) system. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and applied to the NR system, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, 5G communication such as sensor networks, M2M communication, MTC, etc., are being implemented by using techniques such as beam-forming, MIMO, array antennas, etc. The application of cloud radio access network (RAN) as a big data processing technology described above may be an example of convergence of 5G communication technology and IoT technology.

As described above, various services are able to be provided due to the development of mobile communication systems, and thus, there is a need for methods of effectively providing such services.

SUMMARY

According to an embodiment of the present disclosure, data packets may be effectively transmitted and received by providing an electronic device and an operation method of the electronic device in a wireless communication system.

Also, according to an embodiment of the present disclosure, data packets may be effectively transmitted and received by providing a core network and an operation method of the core network in a wireless communication system.

DETAILED DESCRIPTION

Figure 1:
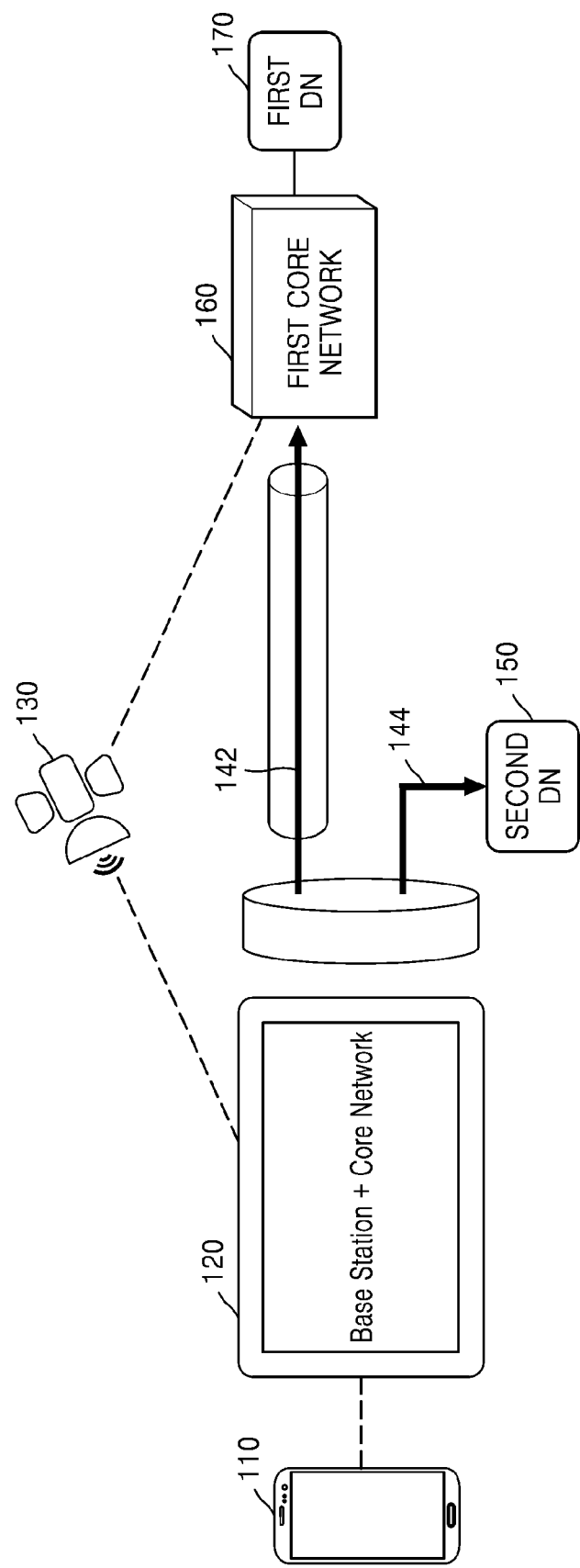
FIG. 1 is a diagram showing an overview of a method, performed by an electronic device, for receiving a packet from a user equipment (UE) and transmitting the same to a data network, according to an embodiment.

An operation method of an electronic device capable of communicating with a first core network, a second core network, and a user equipment (UE), according to an embodiment, includes: provisioning at least one virtual network function (VNF) corresponding to some or all of a plurality of network functions (NFs) included in the first core network; registering, in the first core network, the provisioned at least one VNF; receiving a first packet from the UE and determining a path through which the first packet is to be transmitted, from among a first path between a user plane function (UPF) of the first core network and the electronic device and a second path between a UPF of the second core network and the electronic device; and transmitting the first packet through the determined path.

The determining of the path through which the first packet is to be transmitted may include: filtering the first packet received from the UE, based on at least one of a latency requirement, a type of service, an internet protocol (IP) address of a destination of the first packet, or a traffic amount; and determining the path through which the first packet is to be transmitted, from among the first path and the second path, based on a result of the filtering.

The provisioning of the at least one VNF may include: transmitting a VNF instance request to a network exposure function (NEF) of the first core network; receiving, from the NEF, an instance response including a plurality of pieces of NF information; and provisioning the at least one VNF corresponding to some or all of the plurality of NFs, based on the received instance response.

The registering of the at least one VNF in the first core network may include: generating an aggregated VNF register indicator (AVRI) including information about the provisioned at least one VNF; transmitting the generated AVRI from a virtual security edge protection proxy (V-SEPP) of the electronic device to a security edge protection proxy (SEPP) of the first core network; and receiving, from the first core network, a registration response indicating that the at least one VNF has been registered in the first core network.

The operation method may further include: transmitting, to unified data management (UDM) of the first core network, UE information including at least one of an identifier of the electronic device or a media access control (MAC) address of the UE; transmitting, to a network repository function (NRF) of the first core network, VNF information including at least one of the identifier of the electronic device or an IP address of a virtual user plane function (V-UPF) of the electronic device; and in case that a VNF of the electronic device changes, transmitting update information to the NRF of the first core network.

The operation method may further include: establishing a protocol data unit (PDU) session between the UE and the electronic device; and establishing an N4 session between a V-UPF of the electronic device and a UPF of the first core network.

The operation method may further include: receiving a second packet and a downlink indicator from the first core network; storing the received downlink indicator in a virtual unified data repository (V-UDR); and transmitting the second packet to the UE, based on the received downlink indicator, wherein the downlink indicator may include information about whether the electronic device is capable of transmitting the second packet to the UE.

The provisioning of the at least one VNF may comprise: transmitting, to a network exposure function (NEF) of the first core network, an instance request regarding at least one of a virtual authentication server function (V-AUSF), a virtual application function (V-AF), a virtual access and mobility management function (V-AMF), or a virtual session management function (V-SMF); receiving, from the NEF, an instance response including information about at least one of the V-AUSF, the V-AF, the V-AMF, or the V-SMF; and provisioning a VNF including at least one of the V-AUSF, the V-AF, the V-AMF, or the V-SMF, based on the received instance response, wherein the at least one VNF excluding the provisioned VNF may use an NF of the first core network.

An operation method of a user plane function (UPF) of a core network, according to another embodiment of the present disclosure, includes: receiving, from unified data management (UDM) of the core network, user equipment (UE) information including at least one of an identifier of the UE or a media access control (MAC) address of the UE; generating a port number corresponding to the UE, based on the UE information; and transmitting a packet to an electronic device capable of transmitting the packet to the UE, based on the generated port number.

The operation method may further include: determining whether the electronic device is connected with the UE or not, based on the received UE information; receiving, from a network repository function (NRF) of the core network, update information or virtual network function (VNF) information including at least one of an identifier of the electronic device or an internet protocol (TP) address of a virtual user plane function (V-UPF) of the electronic device; determining whether the core network is connected with the electronic device or not, based on the received update information or VNF information; and determining a downlink indicator including at least one of a result of determining whether the electronic device is connected with the UE or not, or a result of determining whether the core network is connected with the electronic device or not, wherein the transmitting of the packet to the electronic device may include transmitting the downlink indicator and the packet to the electronic device, based on a result of determining that the core network and the electronic device are connected to each other.

An electronic device capable of communicating with a first core network, a second core network, and a user equipment (UE), according to another embodiment of the present disclosure, includes: a transceiver; a memory storing one or more instructions; and at least one processor configured to execute the one or more instructions stored in the memory, wherein the at least one processor is further configured to: provision at least one virtual network function (VNF) corresponding to some or all of a plurality of network functions (NFs) included in the first core network; register, in the first core network, the provisioned at least one VNF; receive a first packet from the UE and determine a path through which the first packet is to be transmitted, from among a first path between a user plane function (UPF) of the first core network and the electronic device and a second path between a UPF of the second core network and the electronic device; and transmit the first packet through the determined path.

A user plane function (UPF) of a core network, according to another embodiment of the present disclosure, includes: a transceiver; a memory storing one or more instructions; and at least one processor configured to execute the one or more instructions stored in the memory, wherein the at least one processor is further configured to: receive, from unified data management (UDM) of the core network, user equipment (UE) information including at least one of an identifier of a UE or a media access control (MAC) address of the UE; generate a port number corresponding to the UE, based on the UE information; and transmitting a packet to an electronic device capable of transmitting the packet to the UE, based on the generated port number.

Hereinafter, embodiments will be described in detail with reference to the accompanying drawings such that one of ordinary skill in the art may easily implement the embodiments. However, the embodiments may be implemented in various different forms and is not limited to the embodiments described herein. Also, in the drawings, parts irrelevant to the description are omitted in order to clearly describe the embodiments, and like reference numerals designate like elements throughout the specification.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression in the plural, unless it has a clearly different meaning in the context. It is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. In particular, the numbers are examples to help understanding, and the embodiments are not limited by these numbers.

The expression such as "at least one" modifies an entire list of components and do not individually modify the components of the list. For example, "at least one of A, B, and C" indicates only A, only B, only C, both A and B, both B and C, both A and C, all of A, B, and C, or a combination thereof.

While terms including ordinal numbers, such as "first", "second", etc., may be used to describe various components, such components are not limited to the above terms. The above terms are used only to distinguish one component from another. For example, without departing from the scope of the rights described in the present disclosure, a first component may be referred to as a second component, and similarly, a second component may be referred to as a first component. The term "and/or" includes a combination of a plurality of related items or one item from among the plurality of related items.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Terms such as "unit" used in the present disclosure indicate software or a hardware component such as a field-programmable gate array (FPGA) or an application-specific integrated circuit (ASIC), and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, features, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

Hereinafter, for convenience of description, the present disclosure uses terms and names defined in the standards for a 5th generation (5G), new ratio (NR), or long-term evolution (LTE) system. However, the present disclosure is not limited by such terms and names, and may be equally applied to systems conforming to other standards.

In other words, while describing the embodiments of the present disclosure in detail, a main target is a communication standard defined by 3GPP, but an important gist of the present disclosure may be applied, with a slight modification, to other communication systems having a similar technical background, within a range not greatly departing from the scope of the present disclosure, and the applicability would be determined by one of ordinary skill in the art.

Throughout the specification, a user terminal denotes a user equipment (UE) and may include both a wireless signal receiver device including only a wireless signal receiver without a transmission function, and transmission and reception hardware having transmission and reception hardware functions for bidirectional communication via a bidirectional communication link. UEs may include a personal computer, a cellular phone, a smart phone, a television (TV), a tablet computer, a laptop computer, a personal digital assistant (PDA), a portable multimedia player (PMP), a navigation device, an MP3 player, a digital camera, a black box, a device mounted on a vehicle, a module inside a device mounted on a vehicle, a vehicle itself, and the like. The examples are not limited thereto and the UEs may include various devices.

Throughout the specification, base stations are subjects performing resource assignment of a terminal, and may include a gNode B, an eNode B, a node B, a base station (BS), a wireless access unit, a base station controller, a node on a network, an access point, and the like, but are not limited thereto.

A user of a UE may use a data service not only domestically but also abroad by using a local breakout roaming (LBO) method, a home-routed roaming method, and the like of a roaming architecture reference model defined by 3GPP TS 23.501. The LBO method may be a method of processing a signaling request from the UE by a visited network. An LBO architecture is an architecture to which the LBO method is applied, and data of the user may be transmitted to a data network (DN) in a visited public land mobile network (VPLMN). The home-routed roaming method may be a method of transmitting, by the visited network, the signaling request from the UE to a home network of the UE. A home-routed roaming architecture is an architecture to which the home-routed roaming method is applied, and data received from the UE may be transmitted to a DN in a home public land mobile network (HPLMN).

When the user uses the data service via the home-routed roaming method in a visited area, a data packet may be transmitted from a user plane function (UPF) of a core network of the visited area to a DN that is the Internet, via a UPF of a home core network. Accordingly, in the home-routed roaming architecture, because the data packet needs to physically move a far distance, long propagation delay may occur, and thus it may be difficult to satisfy requirements of an ultra-low latency service, such as augmented reality (AR), virtual reality (VR), or hologram. This may directly lead to reduction of quality of service (QoS) of the UE that is to use the ultra-low latency service.

On the other hand, when the user uses a data service via the local breakout roaming method in the visited area, the data packet may be directly transmitted from the UPF of the core network of the visited area to a DN. A distance moved by the data packet is shorter in the local breakout roaming method than in the home-routed roaming method, and thus low latency data packet transmission and reception may be possible. However, because the local breakout roaming method provides the data service by being assigned with an Internet protocol (TP) address of the visited area, the user may be unable to use a domestic only web service abroad. Accordingly, the user may use a virtual private network (VPN), but when a private VPN is used, abuse cases, such as privacy invasion, IP address sales, and the like, frequency occur, and thus there is a need for a new roaming scenario for supplementing demerits of each roaming scenario. Also, there is a need for a method or the like for solving a communication disconnection issue in a congested area, such as a disaster area.

FIG. 1 is a diagram showing an overview of a method, performed by an electronic device, for receiving a packet from a UE and transmitting the same to a data network, according to an embodiment.

Referring to FIG. 1, a communication system may include a UE 110, an electronic device 120 capable of performing functions of a virtual radio access network (V-RAN) and virtual core network on the UE 110, a first core network 160, a first DN 170, and a second DN 150. According to an embodiment, the electronic device 120 may be a device for providing a roaming service, a device for distributing a load in a disaster situation or a traffic congested area, a device for forming a home cell, a device used in a general situation, or the like, but is not limited thereto. For example, when a user of the UE 110 uses a roaming service abroad, the second DN 150 may be a DN capable of receiving a data packet through a core network of a visited area. Also, the first core network 160 may be a HPLMN and the first DN 170 may be a DN capable of receiving a data packet from the HPLMN. However, this is only an example and is not limited thereto, and the communication system according to an embodiment may be used for a service other than the roaming service.

According to an embodiment, a first path 142 may be a path for reaching up to the first core network 160 through a base station and a second core network, and a second path 144 may be path for reaching up to the second DN 150 through the base station and the second core network. For example, the electronic device 120 may transmit a packet that requires an ultra-low latency service to the second path 144, and transmit a packet that requires a dedicated service supported by the first DN 170 to the first path 142.

According to an embodiment, the UE 110 may transmit the data packet to the DN through the electronic device 120 or receive the data packet from the DN through the electronic device 120. According to an embodiment, the electronic device 120 may be a mobile network device carried by the user of the UE 110, together with the UE 110. However, the present disclosure is not limited thereto, and the electronic device 120 may be a device installed at a certain area and not carried by the user of the UE 110. The electronic device 120 may receive the data packet from the UE 110 and transmit the same to the DN.

According to an embodiment, the electronic device 120 may receive the data packet from the UE 110, and determine a path for transmitting the packet, from among the first path 142 between the UE 110 and a user plane function (UPF) of the first core network 160, and a second path 144 between the electronic device and a UPF of the second core network. For example, the electronic device 120 may examine the packet received from the UE 110, perform filtering on the packet in consideration of a latency requirement, a type of a service, an IP address of a destination of the packet, a traffic amount, and the like, and determine the path for transmitting the packet from among the first path 142 and the second path 144, based on a result of the filtering. However, elements considered by the electronic device 120 when determining the path for transmitting the packet are not limited thereto.

According to an embodiment, the electronic device 120 may provision at least one virtual network function (VNF) corresponding to some or all of a plurality of network functions (NFs) included in the first core network 160. Also, the electronic device 120 may register, in the first core network 160, the provisioned at least one VNF. According to an embodiment, a control plane between the electronic device 120 and the first core network 160 may use satellite communication 130, Ethernet, Wi-Fi, near field communication (NFC), radio frequency (RF), wired communication, Bluetooth (BT), global positioning system (GPS), infrared communication, or the like, but is not limited thereto. For example, the electronic device 120 may register the at least one VNF in the first core network 160 by using the satellite communication 130. According to an embodiment, after the at least one VNF is registered in the first core network 160, the electronic device 120 may receive an uplink packet from the UE 110 and determine a path for transmitting the uplink packet from among the first path 142 between the UE 110 and the UPF of the first core network 160, and the second path 144 between the electronic device and the UPF of the second core network.

According to an embodiment, the first core network 160 may receive the data packet from the first DN 170 and transmit the data packet to the electronic device 120. The electronic device 120 may transmit the received data packet to the UE 110. According to another embodiment, the electronic device 120 may receive the data packet from the second DN 150 and transmit the same to the UE 110.

According to an embodiment, during an uplink process of receiving a first packet from the electronic device 120, the UPF of the first core network 160 may receive, from unified data management (UDM) of the first core network 160, UE information including an identifier of the UE 110, a media access control (MAC) address of the UE, and the like, but information included in the UE information is not limited thereto. Also, the UPF of the first core network 160 may generate a port identifier corresponding to the UE, based on the UE information. For example, the port identifier may be a port number, but is not limited thereto. According to an embodiment, the UPF of the first core network 160 may transmit a second packet to the electronic device 120, based on the port identifier generated during a downlink process. Also, the electronic device 120 may transmit the received second packet to the UE 110.

Figure 2:
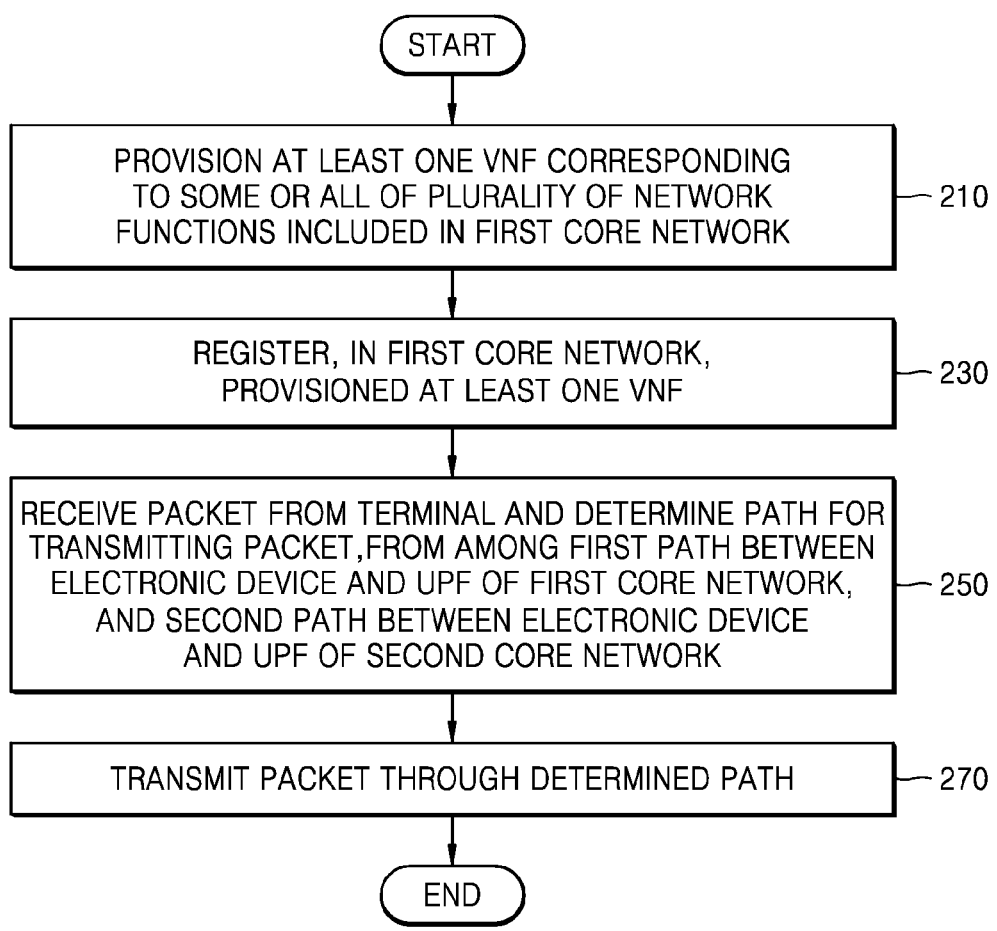
FIG. 2 is a flowchart showing a flow of a method, performed by an electronic device, for receiving a packet from a UE and transmitting the packet through a first path or a second path, according to an embodiment.

FIG. 2 is a flowchart showing a flow of a method, performed by an electronic device, for receiving a packet from a UE and transmitting the packet through a first path or a second path, according to an embodiment.

Referring to FIG. 2, in operation 210, the electronic device may provision at least one VNF corresponding to some or all of a plurality of NFs included in a first core network. According to an embodiment, the provisioned at least one VNF may vary depending on a purpose of use, a function, or the like of the electronic device. For example, when the electronic device is used to provide a roaming service, the electronic device may provision a virtual radio access network (V-RAN), a virtual network exposure function (V-NEF), a virtual network repository function (V-NRF), virtual unified data management (V-UDM), a virtual unified data repository (V-UDR), a virtual authentication server function (V-AUSF), a virtual application function (V-AF), a virtual access and mobility management function (V-AMF), a virtual session management function (V-SMF), a virtual security edge protection proxy (V-SEPP), a virtual user plane function (V-UPF), and the like. However, this is only an example, and fewer or more VNFs than those above may be provisioned. As another example, when the electronic device is used to support communication in a disaster area or to distribute a load in a traffic congested area, the electronic device may provision only V-AUSF, V-AF, V-AMF, and V-SMF for an authentication procedure. As another example, when the electronic device is used to arrange a small cell, such as a home cell, the electronic device may virtualize all NFs of a core network and provision the NFs.

In operation 230, the electronic device may register, in the first core network, the provisioned at least one VNF. According to an embodiment, when a UE is first registered in a virtual core network of the electronic device, the electronic device may register, in the first core network, the provisioned at least one VNF by using information of the provisioned at least one VNF. For example, the electronic device may register the information of the at least one VNF in a network repository function (NRF) of the first core network, via satellite communication.

According to an embodiment, the electronic device may generate an aggregated VNF register indicator (AVRI) including the information about the provisioned at least one VNF. According to an embodiment, the AVRI is an identifier in which the information of the provisioned at least one VNF is aggregated, and when the satellite communication or the like that requires high costs in a control plane is used, the electronic device may efficiently register, in the first core network, the information of the at least one VNF. Also, the electronic device may transmit the AVRI from the V-SEPP of the electronic device to a SEPP of the first core network. The first core network may receive the AVRI from the electronic device, register the at least one VNF in the first core network, based on the AVRI, and then transmit, to the electronic device, a registration response indicating that the at least one VNF has been registered in the first core network. However, this is only an example, and the electronic device may register the information of the at least one VNF in the NRF of the first core network, via non-cellular communication instead of the satellite communication. For example, the satellite communication requires high expenses, whereas the Ethernet or Wi-Fi do not require high expenses, and thus the electronic device may omit a process of generating the AVRI when the control plane uses the Ethernet or Wi-Fi to register the at least one VNF in the first core network. Accordingly, the electronic device may register the information of the provisioned at least one VNF in the first core network by transmitting the same without an aggregation process, or may register the at least one VNF in the first core network, based on the AVRI, by generating the AVRI.

In operation 250, the electronic device may receive a packet from the UE and determine a path through which the packet is to be transmitted, from among a first path between a user plane function (UPF) of the first core network and the electronic device and a second path between a UPF of a second core network and the electronic device. According to an embodiment, the electronic device may perform filtering on the packet received from the UE, based on a latency requirement, a type of a service, an IP address of a destination of the packet, a traffic amount, and the like. Also, the electronic device may determine the path for transmitting the packet, from among the first path and the second path, based on a result of the filtering. According to an embodiment, the first path may be a path connected to the first core network to transmit the packet to a first data network (DN), and the second path may be a path for transmitting the packet to a second DN. For example, the first path may be a path between the UPF of the first core network and the V-UPF of the electronic device, and the second path may be a path between the UPF of the second core network and the V-UPF of the electronic device. Accordingly, for example, the electronic device may determine the second path for the packet that requires low latency, and the first path for the packet that is to use a service of the first DN 170.

In operation 270, the electronic device may transmit the packet through the determined path. According to an embodiment, when the electronic device determines to transmit the packet through the first path in operation 250, the electronic device transmits the packet through the first path, and when the electronic device determines to transmit the packet through the second path in operation 250, the electronic device transmits the packet through the second path. For example, when the electronic device determines to transmit the packet through the second path upon determining that traffic of the first path is overloaded, the electronic device may transmit the packet received from the UE through the second path. According to an embodiment, quality of service (QoS) of the UE may improve when the electronic device transmits the packet through the path determined according to the traffic.

According to an embodiment, the electronic device may perform filtering on the packet received from the UE, based on the latency requirement, the type of the service, the IP address of the destination of the packet received from the UE, the traffic amount, and the like. Also, the electronic device may determine the path for transmitting the packet, from among the first path or the second path, based on the result of the filtering.

According to an embodiment, to provision the at least one VNF, the electronic device may transmit a VNF instance request to an NEF of the first core network. Also, the electronic device may receive an instance response including a plurality of pieces of NF information from the NEF of the first core network, and provision the at least one VNF corresponding to some or all of the plurality of NFs, based on the received instance response.

According to an embodiment, the electronic device may generate the AVRI including the information about the provisioned at least one VNF, so as to register the at least one VNF in the first core network. Also, the electronic device may transmit the generated AVRI from the V-SEPP of the electronic device to a SEPP of the first core network, and receive, from the first core network, a registration response indicating that the at least one VNF has been registered in the first core network.

According to an embodiment, the electronic device may transmit, to the UDM of the first core network, UE information including at least one of an identifier of the electronic device, an identifier of the UE, and an MAC address of the UE. The UE information may be used by the first core network to determine whether the electronic device is able to transmit a downlink packet to the UE. Also, the electronic device may transmit, to the NRF of the first core network, VNF information including at least one of the identifier of the electronic device and an IP address of the V-UPF of the electronic device. According to an embodiment, when there is a change in the VNF of the electronic device, the electronic device may transmit update information to the NRF of the first core network. Upon being newly assigned with an IP address, the V-UPF may update the IP address of the V-UPF in the NRF of the first core network or update the IP address of the V-UPF in the NRF periodically. According to an embodiment, the VNF information or update information transmitted by the electronic device to the NRF of the first core network may be used to determine whether the first core network is able to transmit the downlink packet to the electronic device.

According to an embodiment, the electronic device may establish a protocol data unit (PDU) session between the UE and the electronic device. Also, the electronic device may establish an N4 session between the V-UPF of the electronic device and the UPF of the first core network.

According to an embodiment, the electronic device may receive, from the core network, the downlink packet, a downlink indicator, or the like. Also, the electronic device may store the received downlink indicator in the V-UDR, and transmit the downlink packet to the UE based on the received downlink indicator. According to an embodiment, the downlink indicator may include information about whether the electronic device is able to transmit the downlink packet to the UE.

According to an embodiment, the electronic device may transmit, to the NEF of the first core network, an instance request regarding at least one of the V-AUSF, the V-AF, the V-AMF, and the V-SMF, receive, from the NEF of the first core network, an instance response including information about at least one of the V-AUSF, the V-AF, the V-AMF, and the V-SMF, and provision a VNF including at least one of the V-AUSF, the V-AF, the V-AMF, and the V-SMF, based on the received instance response. Also, the electronic device may use the NF of the first core network for a VNF excluding the provisioned VNF.

Figure 3:
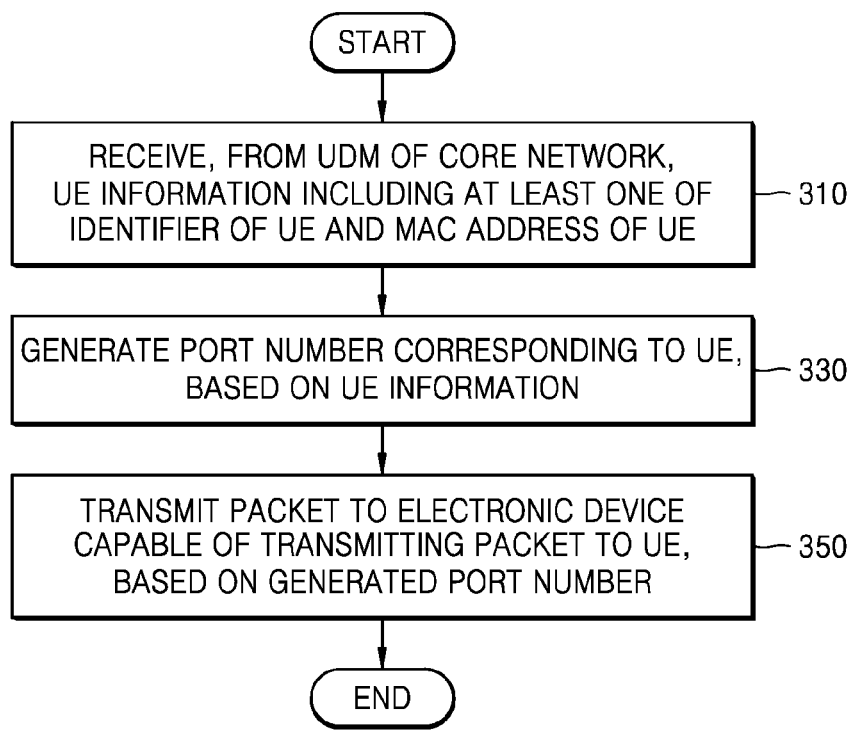
FIG. 3 is a flowchart schematically showing a flow of a method, performed by a user plane function (UPF) of a core network, for transmitting a packet to an electronic device capable of transmitting a packet to a UE, according to an embodiment.

FIG. 3 is a flowchart schematically showing a flow of a method, performed by a UPF of a core network, for transmitting a packet to an electronic device capable of transmitting a packet to a UE, according to an embodiment.

Referring to FIG. 3, in operation 310, the UPF of the core network may receive, from a UDM of the core network, UE information including at least one of an identifier of the UE and an MAC address of the UE. According to an embodiment, the UDM of the core network may also store, while storing the UE information, the identifier of the UE, the MAC address of the UE, and reachability information of the UE. Here, the reachability information of the UE may include information about whether the UE and the electronic device are connected to each other. The UDM of the core network may determine the reachability information of the UE, according to registration management (RM)-registered/RM-deregistered state information of a V-AMP and frequency availability of the UE. In other words, when the electronic device is able to transmit/receive the packet to/from the UE, the UDM of the core network may store, together with the UE information, information indicating that there is reachability from the electronic device to the UE.

In operation 330, the UPF of the core network may generate a port number corresponding to the UE, based on the UE information. According to an embodiment, the electronic device may be a portable mobile network device having mobility. Accordingly, an IP address of a V-UPF of the electronic device may be changed before the electronic device receives a response packet from the core network after transmitting an uplink packet to the core network. Even when the IP address of the V-UPF of the electronic device is changed, in order for the core network to transmit the response packet to the UE through the electronic device, an SMF of the core network may generate the port number for identifying the electronic device and UE, based on an identifier of the electronic device and the MAC address of the UE from the UE information stored by the UDM of the core network. For example, when the UEs connected to the electronic device are a first UE and a second UE, the electronic device may receive a first uplink packet from the first UE and transmit the same to the core network. Accordingly, the core network may generate a first port number, based on an MAC address of the first UE, the identifier of the electronic device, and an IP address of the V-UPF of the electronic device. The core network may transmit, to the electronic device, a first downlink packet that is a response packet regarding the first uplink packet, based on the first port number. As another example, the electronic device may receive a second uplink packet from the second UE and transmit the same to the core network. Accordingly, the core network may generate a second port number, based on an MAC address of the second UE, the identifier of the electronic device, and the IP address of the V-UPF of the electronic device. The core network may transmit, to the electronic device, a second downlink packet that is a response packet regarding the second uplink packet, based on the second port number. The second port number may be a port number different from the first port number.

In operation 350, the UPF of the core network may transmit the packet to the electronic device capable of transmitting the packet to the UE, based on the generated port number. According to an embodiment, the UPF of the core network may examine the identifier of the electronic device, the MAC address of the UE, and the like of the packet to be transmitted, and when there is a packet matching a traffic filter, transmit the packet to a DN by inserting the port number to a departure IP address. According to an embodiment, even when the IP address of the V-UPF is changed before the UPF of the core network receives a downlink packet that is a response packet from the DN after transmitting an uplink packet to the DN, the core network may identify the changed IP address of the electronic device through the port number and transmit the downlink packet to the electronic device capable of transmitting the packet to the UE.

According to an embodiment, the UPF of the core network receives the UE information and determine whether the electronic device and the UE are connected to each other, based on the UE information. Also, the UPF of the core network may receive, from an NRF of the core network, update information or VNF information including at least one of the identifier of the electronic device and an IP address of the V-UPF of the electronic device, and determine whether the core network and the electronic device are connected to each other, based on the received update information or VNF information. Also, the UPF of the core network may determine a downlink indicator indicating information including at least one of a result of determining whether the electronic device and the UE are connected to each other or a result of determining whether the core network and the electronic device are connected to each other, and transmit the downlink indicator and the packet to the electronic device, based on a result of determining that the core network and the electronic device are connected to each other.

Figure 4:
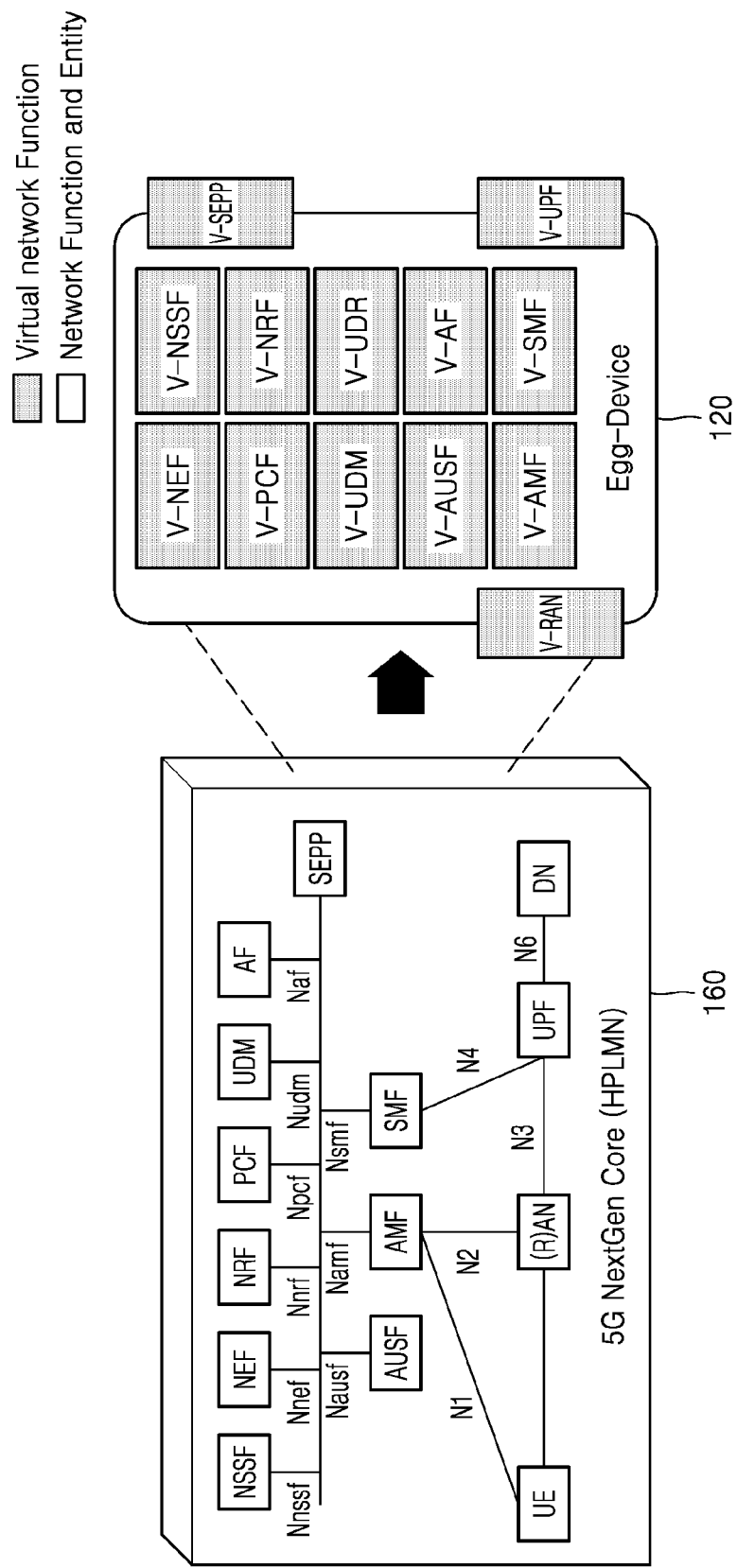
FIG. 4 is a diagram schematically showing a provisioning method on a core network performed by an electronic device, according to an embodiment.

FIG. 4 is a diagram schematically showing a provisioning method on a core network, performed by an electronic device, according to an embodiment.

Referring to FIG. 4, the electronic device 120 may be an egg-device corresponding to a portable mobile device, and the core network 160 may be an HPLMN. However, this is only an example for convenience of description, and an electronic device and a core network may be an electronic device and a core network other than the portable mobile device and the HPLMN, respectively. The electronic device 120 may provision at least one VNF required according to the purpose of service to be provided. According to an embodiment, among the VNFs of the electronic device 120, a V-AF that is a VNF reliable to the core network 160 may request the core network 160 for a VNF instance. In other words, the V-AF of the electronic device 120 may perform an authentication process with an AUSF of the core network 160. Also, when the authentication process is completed, the V-AF may request an NEF of the core network 160 for the VNF instance. The NEF of the core network 160 may gather information of the NFs of the core network from an NRF of the core network, and transmit the same to the V-AF. The V-AF may receive the information of the NFs of the core network and provision at least one VNF, based on the received information. Here, a type of VNF requesting the VNF instance may vary depending on the purpose of the electronic device 120.

For example, when the electronic device 120 is used for a roaming service, the electronic device 120 may perform a provisioning process before leaving a country. As another example, when the electronic device 120 is used for a home-cell, the electronic device 120 may perform the provisioning process when the electronic device 120 is initially turned on by a user. As another example, when the electronic device 120 is used for load distribution in a disaster area or a traffic congested area, the electronic device 120 may perform the provisioning process when determined by the user or when it is determined that traffic is equal to or greater than a threshold value. However, this is only an example and a time when the electronic device performs the provisioning process is not limited thereto.

Figure 5:
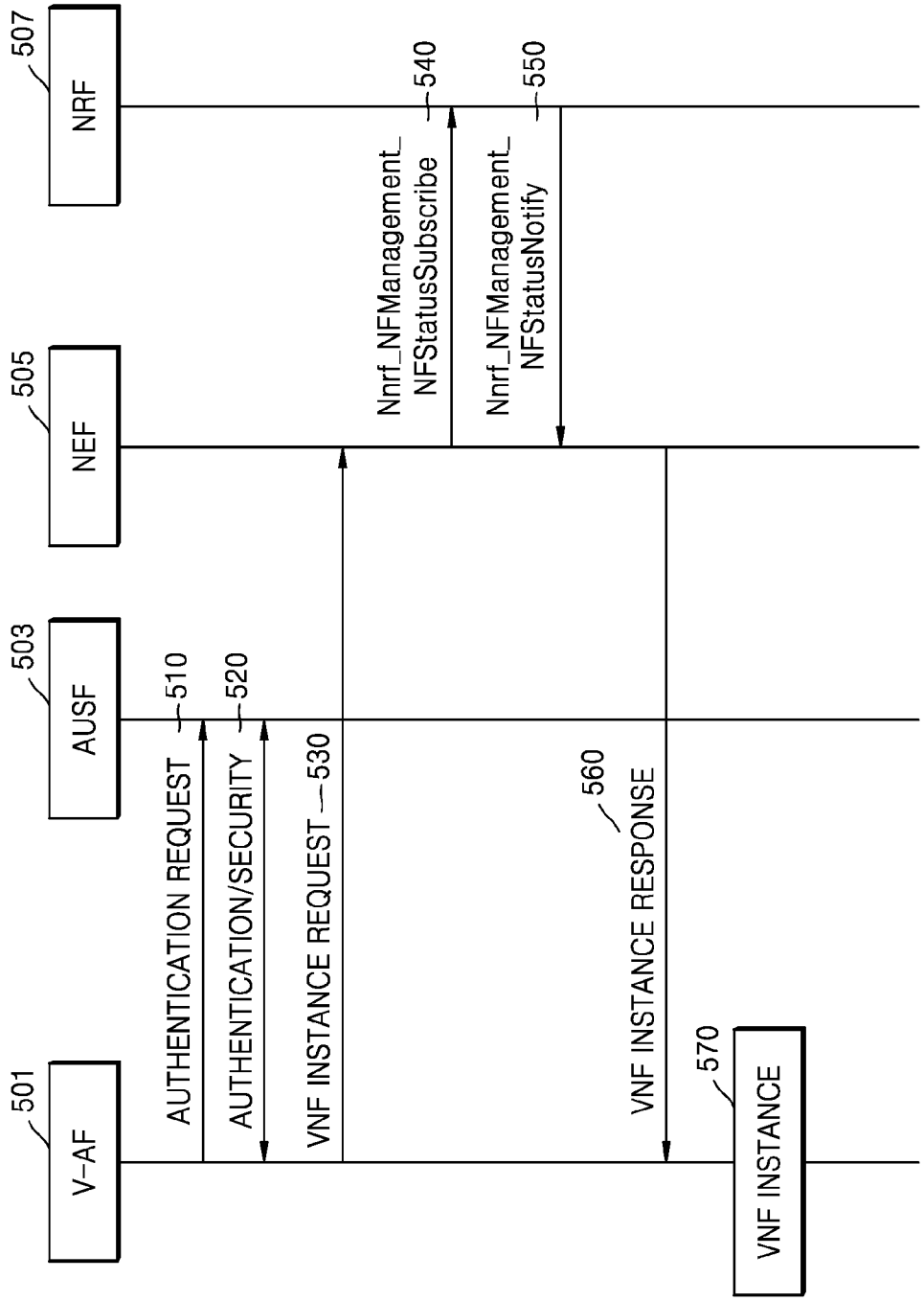
FIG. 5 is a flowchart schematically showing a provisioning method on a core network performed by an electronic device, according to an embodiment.

FIG. 5 is a flowchart schematically showing a provisioning method on a core network, performed by an electronic device, according to an embodiment.

Referring to FIG. 5, a V-AF 501 of the electronic device, and an AUSF 503, an NEF 505, an NRF 507 of the core network may perform a process for provisioning a VNF of the electronic device.

In operation 510, the V-AF 501 of the electronic device may transmit an authentication request to the AUSF 503 of the core network. According to an embodiment, in a case where the VNFs of the electronic device are not provisioned, when the electronic device is turned on, the V-AF 501 that is a VNF reliable to the core network may be executed. The executed V-AF 501 may transmit the authentication request to the AUSF 503 of the core network.

In operation 520, the AUSF 503 of the core network may perform an authentication/security procedure with the V-AF 501 of the electronic device. According to an embodiment, the AUSF 503 of the core network may perform the authentication/security procedure with the V-AF 501 of the electronic device, based on the authentication request received from the V-AF 501 of the electronic device.

In operation 530, the V-AF 501 of the electronic device may transmit a VNF instance request to the NEF 505 of the core network. According to an embodiment, the V-AF 501 of the electronic device may transmit the VNF instance request to the NEF 505 of the core network when the authentication/security procedure is completed. A type of a VNF instanced to the electronic device may vary according to the purpose of use of the electronic device.

In operation 540, the NEF 505 of the core network may transmit, to the NRF 507 of the core network, an Nnrf_NFManagement_NFStatusSubscribe message. According to an embodiment, an Nnrf_NFManagement service may support registration, unsubscription, and update services associated with an NF, an NF service, or the like. In other words, Nnrf_NFManagement_NFStatusSubscribe may be a message requesting subscription of a state of registration, unsubscription, update, or the like associated with the NF, NF service, or like. The NEF 505 of the core network may transmit, to the NRF 507 of the core network, the Nnrf_NFManagement_NFStatusSubscribe message to obtain information of the NF of the core network.

In operation 550, the NRF 507 of the core network may transmit an Nnrf_NFManagement_NFStatusNotify message to the NEF 505 of the core network. According to an embodiment, the NRF 507 of the core network may transmit, to the NEF 505 of the core network, the Nnrf_NFManagement_NFStatusNotify message including the information about the VF of the core network.

In operation 560, the NEF 505 of the core network may transmit a VNF instance response to the V-AF 501 of the electronic device. According to an embodiment, the NEF 505 of the core network may transmit the VNF instance response to the V-AF 501 of the electronic device, based on the Nnrf_NFManagement_NFStatusNotify message including the information about the VF received from the NRF 507 of the core network.

In operation 570, the V-AF 501 of the electronic device may perform a VNF instance process. According to an embodiment, the V-AF 501 of the electronic device may instance at least one required VNF, based on the VNF instance response received from the NEF 505 of the core network. The V-AF may provision the at least one VNF, based on corresponding information.

Figure 6:
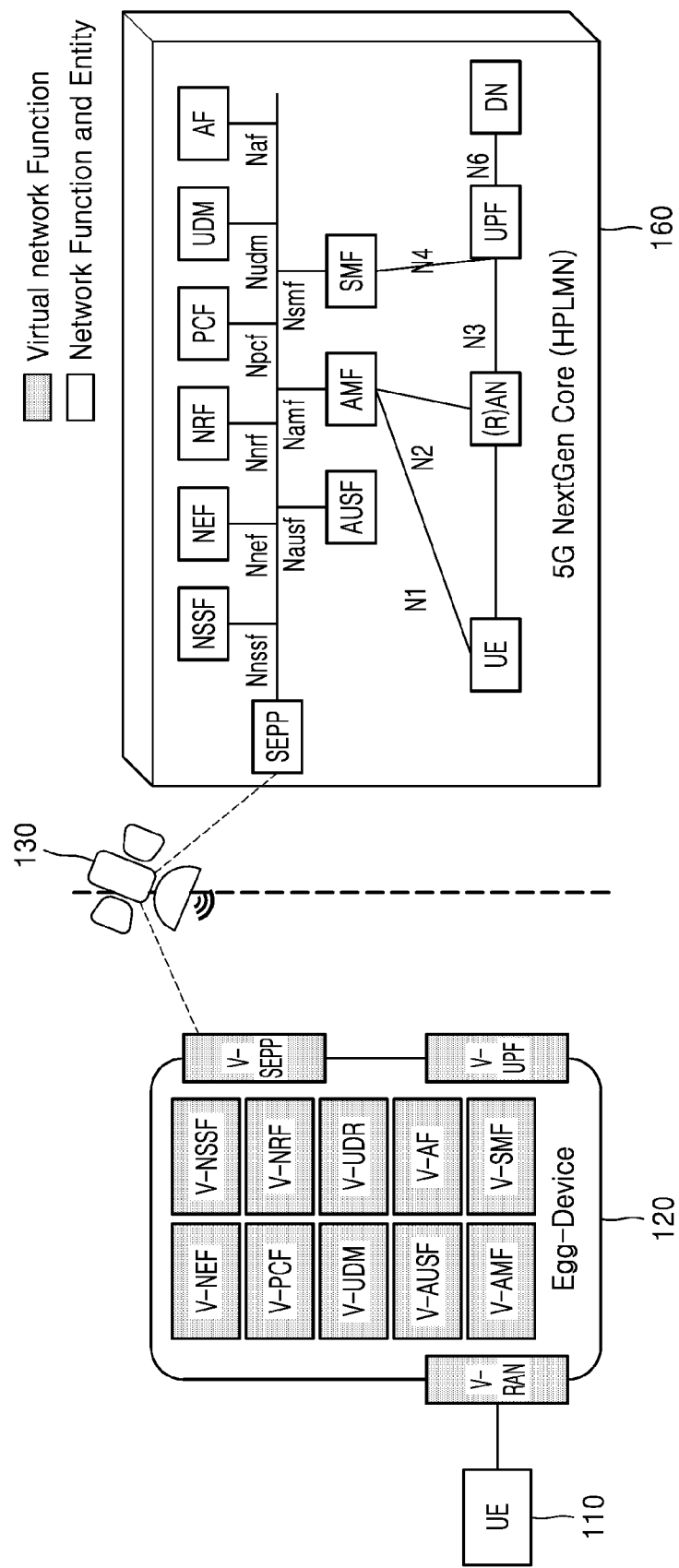
FIG. 6 is a diagram schematically showing a method for registering at least one virtual network function (VNF) of an electronic device in a core network, according to an embodiment.

FIG. 6 is a diagram schematically showing a method for registering at least one VNF of an electronic device in a core network, according to an embodiment.

Referring to FIG. 6, the electronic device 120 may be an egg-device corresponding to a portable mobile device, and the core network 160 may be an HPLMN. However, this is only an example for convenience of description, and an electronic device and a core network may be an electronic device and a core network other than the portable mobile device and the HPLMN, respectively. The electronic device 120 may communicate with the UE 110 wirelessly or via wires. For example, the electronic device 120 may communicate with the UE 110 by using short range communication including Bluetooth communication, Bluetooth low energy (BLE) communication, near field communication, wireless local area network (WLAN) (Wi-FI0 communication, Zigbee communication, infrared data association (IrDA) communication, Wi-Fi direct (WFD) communication, ultra wideband (UWB) communication, and Ant+ communication, but a method of communicating with the UE 110 is not limited thereto.

According to an embodiment, the electronic device 120 may register provisioned at least one VNF in the core network 160 by using a wired or wireless communication network, such as satellite communication, the Ethernet, Wi-Fi, ad-hoc communication, or mobile communication, but this is only an example, and a communication method used to register at least one VNF in the core network 160 is not limited thereto.

For example, the electronic device 120 may register, in the core network 160, the provisioned at least one VNF through the satellite communication 130. When the satellite communication 130 is used in a control plane, the V-NRF of the electronic device 120 may aggregate information of the provisioned at least one VNF and register the same in the NRF of the core network, considering costs. According to an embodiment, the V-NRF may generate an AVRI including the information about the provisioned at least one VNF. The AVRI may include information of an electronic device including an identifier of the electronic device, an entire size of a packet including the AVRI to be registered, a flag including the number (for example, K) of VNFs to be registered, a VNF instance identifier of a first VNF to be registered, VNF information 1 including a VNF type or the like, a VNF instance identifier of a second VNF to be registered, VNF information 2 including a VNF type or the like, . . . , a VNF instance identifier of a K-th VNF to be registered, and VNF information K including a VNF type or the like. Information of each VNF may be positioned behind a flag. According to an embodiment, the entire size of the packet including the AVRI to be registered may be used when the core network determines a transmission error during transmission/reception processes of the packet including the AVRI, a type of a VNF according to a loss of the packet, an error of the number of VNFs, or the like.

According to an embodiment, the V-NRF may transmit a VNF registration request message by inserting the generated AVRI to the VNF registration request message, from the V-SEPP of the electronic device to the SEPP of the first core network. According to an embodiment, when the electronic device 120 uses the AVRI, effects, such as reduction in the number of transmissions in an unstable wireless environment, improvement in efficiency of a battery of the electronic device, cost reduction, signaling overhead reduction, and acknowledgement reduction, may follow.

For example, when the electronic device 120 is used for a roaming service, the electronic device 120 may perform a registration process before leaving a country. As another example, when the electronic device 120 is used for a home-cell, the electronic device 120 may perform the registration process immediately after a provisioning process is completed. As another example, when the electronic device 120 is used for load distribution in a disaster area or a traffic congested area, the electronic device 120 may perform the registration process when determined by the user or immediately after the provisioning process is completed. However, this is only an example, and a time when the electronic device performs a process of registering the at least one VNF in the core network is not limited thereto.

Figure 7:
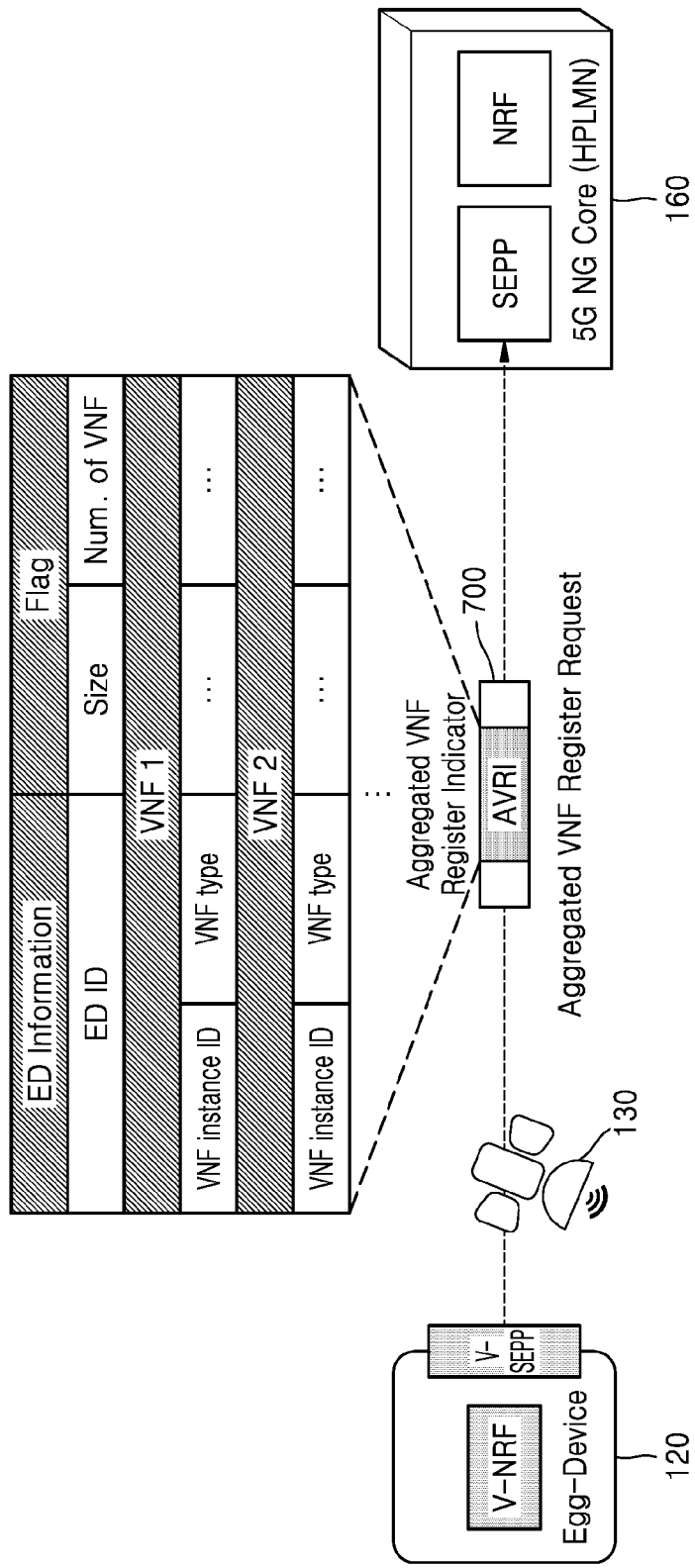
FIG. 7 is a diagram schematically showing a method, performed by an electronic device, for registering at least one VNF in a core network, by using an aggregated VNF register indicator (AVRI), according to an embodiment.

FIG. 7 is a diagram schematically showing a method, performed by an electronic device, for registering at least one VNF in a core network, by using an AVRI, according to an embodiment.

Referring to FIG. 7, the electronic device 120 may be an egg-device corresponding to a portable mobile device, and the core network 160 may be an HPLMN. However, this is only an example for convenience of description, and the electronic device 120 and the core network 160 may be an electronic device and a core network other than the portable mobile device and the HPLMN, respectively.

According to an embodiment, the electronic device 120 may register provisioned at least one VNF in the core network 160, by using an AVRI. For example, the electronic device 120 may register the provisioned VNF in the core network 160 by using the satellite communication 130 in a control plane. However, this is only an example, and the electronic device 120 may register the VNF in the core network 160 by using communication, such as the Ethernet, Wi-Fi, ad-hoc communication, or the like, other than the satellite communication 130. When the satellite communication 130 is used in the control plane, the V-NRF of the electronic device 120 may aggregate information of the provisioned VNF and register the same in the core network 160, considering high costs. In other words, the V-NRF of the electronic device 120 may generate the AVRI including the information about the provisioned VNF, and transmit the AVRI from the V-SEPP of the electronic device to the SEPP of the core network. According to an embodiment, the AVRI may include information of an electronic device including an identifier of the electronic device, an entire size of a packet including the AVRI to be registered, a flag including the number (for example, K) of VNFs to be registered, a VNF instance identifier of a first VNF to be registered, VNF information 1 including a VNF type or the like, a VNF instance identifier of a second VNF to be registered, VNF information 2 including a VNF type or the like, . . . , a VNF instance identifier of a K-th VNF to be registered, and VNF information K including a VNF type or the like. The information of each VNF may be included in the AVRI after a flag. According to an embodiment, when the satellite communication 130 is used in the control plane, the AVRI may be used, thereby displaying effects, such as reduction in the number of transmissions in an unstable wireless environment, improvement in efficiency of a battery of the electronic device 120, signaling overhead reduction, acknowledgement reduction, and cost reduction.

Figure 8:
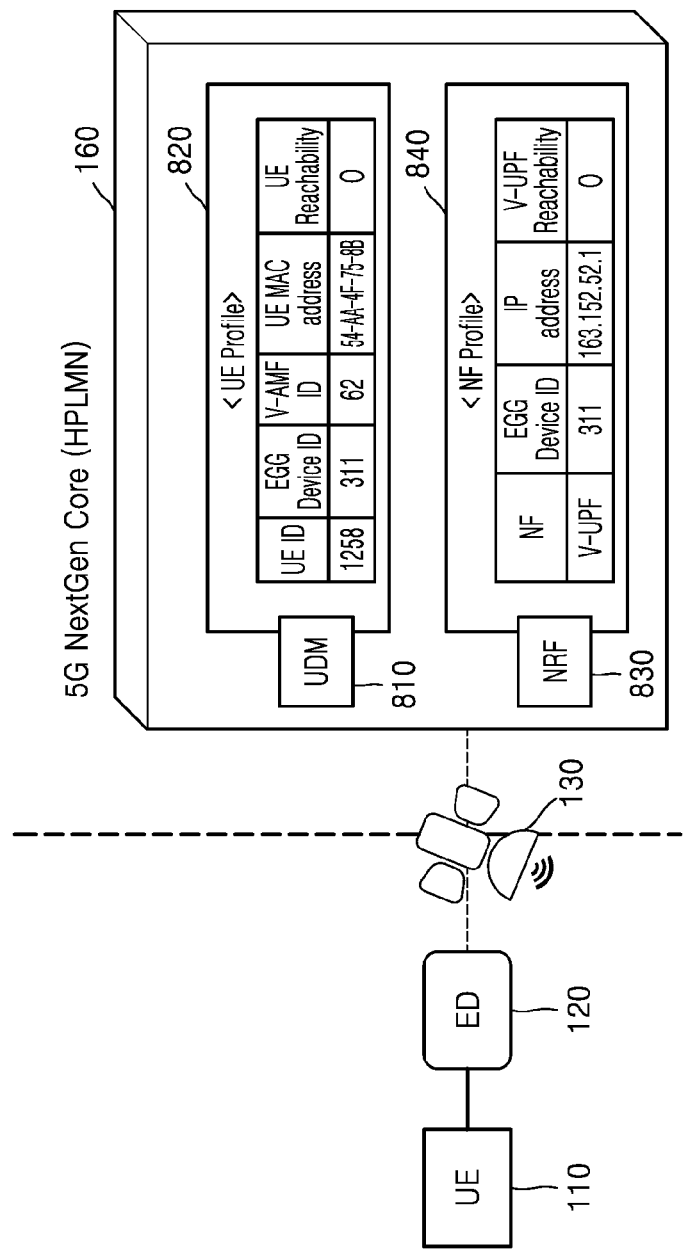
FIG. 8 is a diagram schematically showing a method, performed by a core network, for transmitting a packet to a UE by using UE information, VNF information, and the like, according to an embodiment.

FIG. 8 is a diagram schematically showing a method, performed by a core network, for transmitting a packet to a UE by using UE information, VNF information, and the like, according to an embodiment.

Referring to FIG. 8, the electronic device 120 may be an egg-device (ED) corresponding to a portable mobile device, and the core network 160 may be an HPLMN. However, this is only an example for convenience of description, and the electronic device 120 and the core network 160 may be an electronic device and a core network other than the portable mobile device and the HPLMN, respectively.

According to an embodiment, the core network 160 may store an identifier (ID) of the UE 110, an MAC address of the UE 110, and information about reachability of the UE 110, so as to store information of the UE 110 connected to the electronic device 120. The information about the reachability of the UE 110 may include information indicating that the UE 110 and the electronic device 120 are connected to each other. According to an embodiment, a UDM 810 of the core network 160 may determine and store the reachability of the UE 110 by receiving, from the V-AMF of the electronic device 120, RM-registered/RM-deregistered state information, frequency availability of the UE 110, and the like.

According to an embodiment, the core network 160 may store VNF information, an identifier (ID) of the electronic device 120, an IP address of the V-UPF, and information about reachability of the electronic device 120. The information about the reachability of the electronic device 120 may include information indicating that the electronic device 120 and the core network 160 are connected to each other. According to an embodiment, an NRF 830 of the core network 160 may store the identifier of the electronic device, the IP address of the V-UPF, and the information about the reachability of the electronic device 120, while storing information of the V-UPF. When the IP address of the V-UPF is newly assigned, the V-UPF of the electronic device 120 may update the NRF 830 of the core network 160 with the new IP address, and periodically update the NRF 830 of the core network 160 with the IP address after being first registered in the core network. The NRF 830 of the core network 160 may determine and store the reachability of the electronic device 120, based on a timeout of an update periodic timer of the V-UPF.

Figure 9:
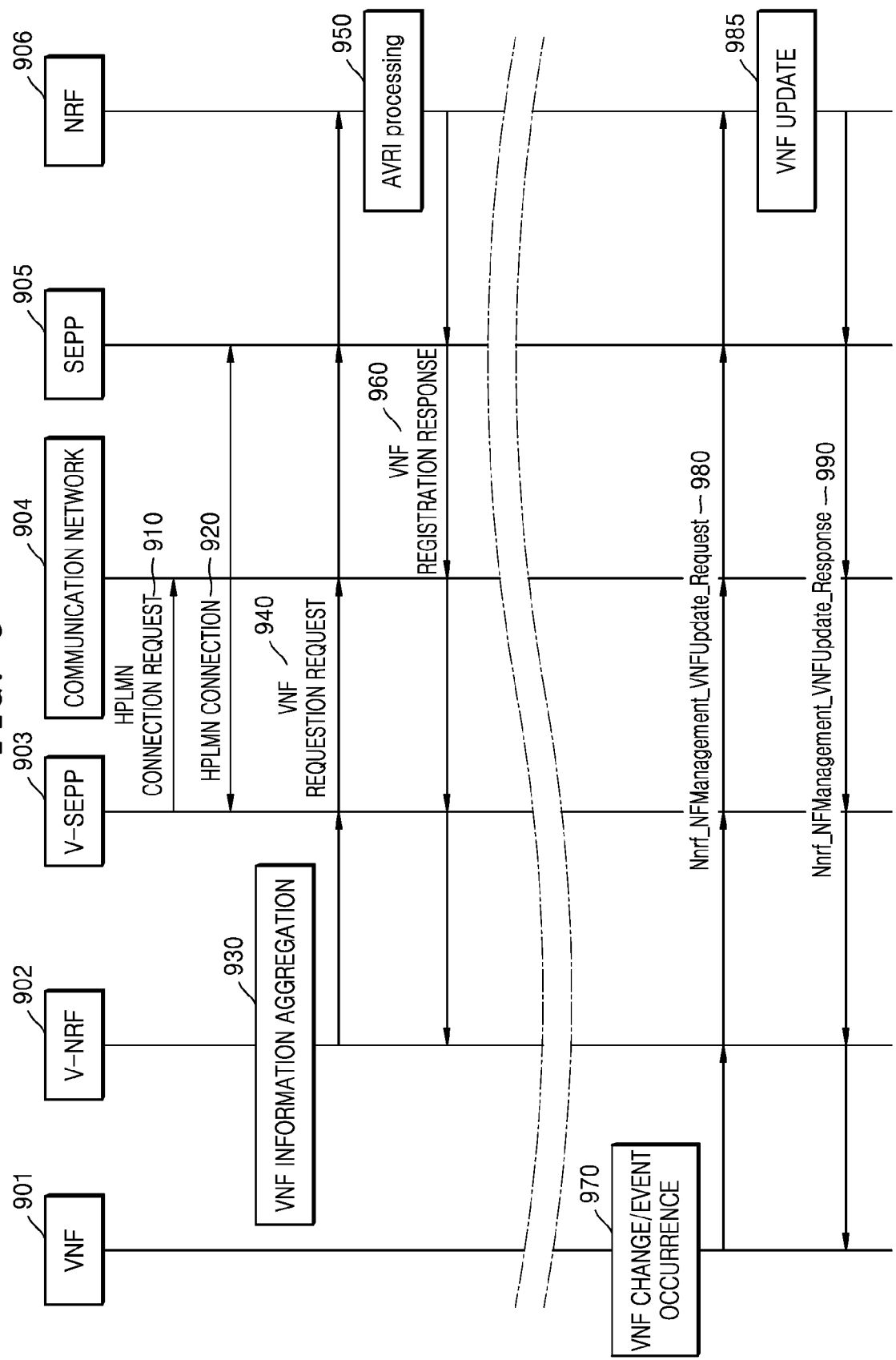
FIG. 9 is a flowchart showing a flow of a method for registering at least one VNF of an electronic device in a core network, and changing or updating the at least one VNF, according to an embodiment.

FIG. 9 is a flowchart showing a flow of a method for registering at least one VNF of an electronic device in a core network, and changing or updating the at least one VNF, according to an embodiment.

Referring to FIG. 9, a VNF 901 of the electronic device, a V-NRF 902 of the electronic device, a V-SEPP 903 of the electronic device, a communication network 904, a SEPP 905 of the core network, and an NRF 906 of the core network register the VNF of the electronic device in the core network, and when a change or event occurs in the VNF of the electronic device, may perform a process of updating the same in the core network.

In operation 910, the V-SEPP 903 may transmit an HPLMN connection request to the communication network 904. For example, the communication network 904 may be a communication satellite, the Ethernet, a Wi-Fi communication network, or an ad-hoc communication, but is not limited thereto.

In operation 920, an HPLMN connection may be formed between the V-SEPP 903 of the electronic device and the SEPP 905 of the core network, by using the communication network 904. According to an embodiment, the HPLMN connection may be formed as the communication network 904 transmits the HPLMN connection request received from the V-SEPP 903 of the electronic device to the SEPP 905 of the core network.

In operation 930, the V-NRF 902 of the electronic device may aggregate information of the VNF. For example, when the communication network 904 used on a control plane is a communication satellite, an AVRI may be generated by aggregating information of a provisioned VNF of the electronic device before VNF information is transmitted to the core network, for cost reduction. As another example, when the communication network 904 used on the control plane is the Ethernet, Wi-Fi, or ad-hoc communication, a process of generating the AVRI by performing operation 930 or aggregating the information of VNF of the electronic device may be omitted.

In operation 940, the V-NRF 902 of the electronic device may transmit a VNF registration request to the V-SEPP 903 of the electronic device, the V-SEPP 903 of the electronic device may transmit the VNF registration request to the SEPP 905 of the core network through the communication network 904, and the SEPP 905 of the core network may transmit the VNF registration request to the NRF 906 of the core network. According to an embodiment, the VNF registration request may include the AVRI that is the VNF information aggregated by the V-NRF 902 in operation 930.

In operation 950, the NRF 906 of the core network may perform AVRI processing, based on the AVRI included in the received VNF registration request. According to an embodiment, the NRF 906 of the core network may perform a registration process of registering the VNF 901 of the electronic device in the core network, based on information of the VNF 901 of the electronic device included in the AVRI.

In operation 960, the NRF 906 of the core network may register the VNF 901 of the electronic device in the core network, and then transmit a VNF registration response to the SEPP 905 of the core network. The SEPP 905 of the core network may transmit the registration response to the V-SEPP 903 of the electronic device through the communication network 904. The V-SEPP 903 of the electronic device may complete the registration process by transmitting the registration response to the V-NRF 902 of the electronic device.

In operation 970, the number or type of provisioned VNFs 901 of the electronic device may be changed or a new event may occur in relation to the VNF 901 of the electronic device. According to an embodiment, when the number and/or types of VNFs 901 of the electronic device are changed, the change may be notified to the core network to continuously transmit/receive a packet to/from the core network.

In operation 980, the VNF 901 of the electronic device may transmit, to the V-NRF 902 of the electronic device, Nnrf_NFManagement_VNFUpdate_Request including information about the change in the number and/or types of VNFs 901 of the electronic device or the occurrence of the event. According to an embodiment, the V-NRF 902 of the electronic device may transmit Nnrf_NFManagement_VNFUpdate_Request to the SEPP 905 of the core network through the communication network 904. The SEPP 905 of the core network may transmit Nnrf_NFManagement_VNFUpdate_Request to the NRF 906 of the core network. According to another embodiment, the V-NRF 902 of the electronic device may transmit Nnrf_NFManagement_VNFUpdate_Request to the SEPP 905 of the core network through a communication network other than the communication network 904.

In operation 985, the NRF 906 of the core network may update registration information of the VNF of the electronic device, based on information included in the received Nnrf_NFManagement_VNFUpdate_Request. According to an embodiment, the NRF 906 of the core network may update the registration information of the VNF of the electronic device, and then notify the electronic device about the update again.

In operation 990, the NRF 906 of the core network may transmit, to the SEPP 905 of the core network, Nnrf_NFManagement_VNFUpdate_Response including information indicating that the registration information of the VNF of the electronic device has been update. According to an embodiment, the SEPP 905 of the core network may transmit Nnrf_NFManagement_VNFUpdate_Response received from the NRF 906 of the core network to the V-SEPP 903 of the electronic device through the communication network 904. Also, the V-NRF 902 may receive Nnrf_NFManagement_VNFUpdate_Response from the V-SEPP 903 of the electronic device and transmit the same to the VNF 901 of the electronic device. According to another embodiment, the SEPP 905 of the core network may transmit Nnrf_NFManagement_VNFUpdate_Response received from the NRF 906 of the core network to the V-SEPP 903 of the electronic device through a communication network other than the communication network 904.

Figure 10:
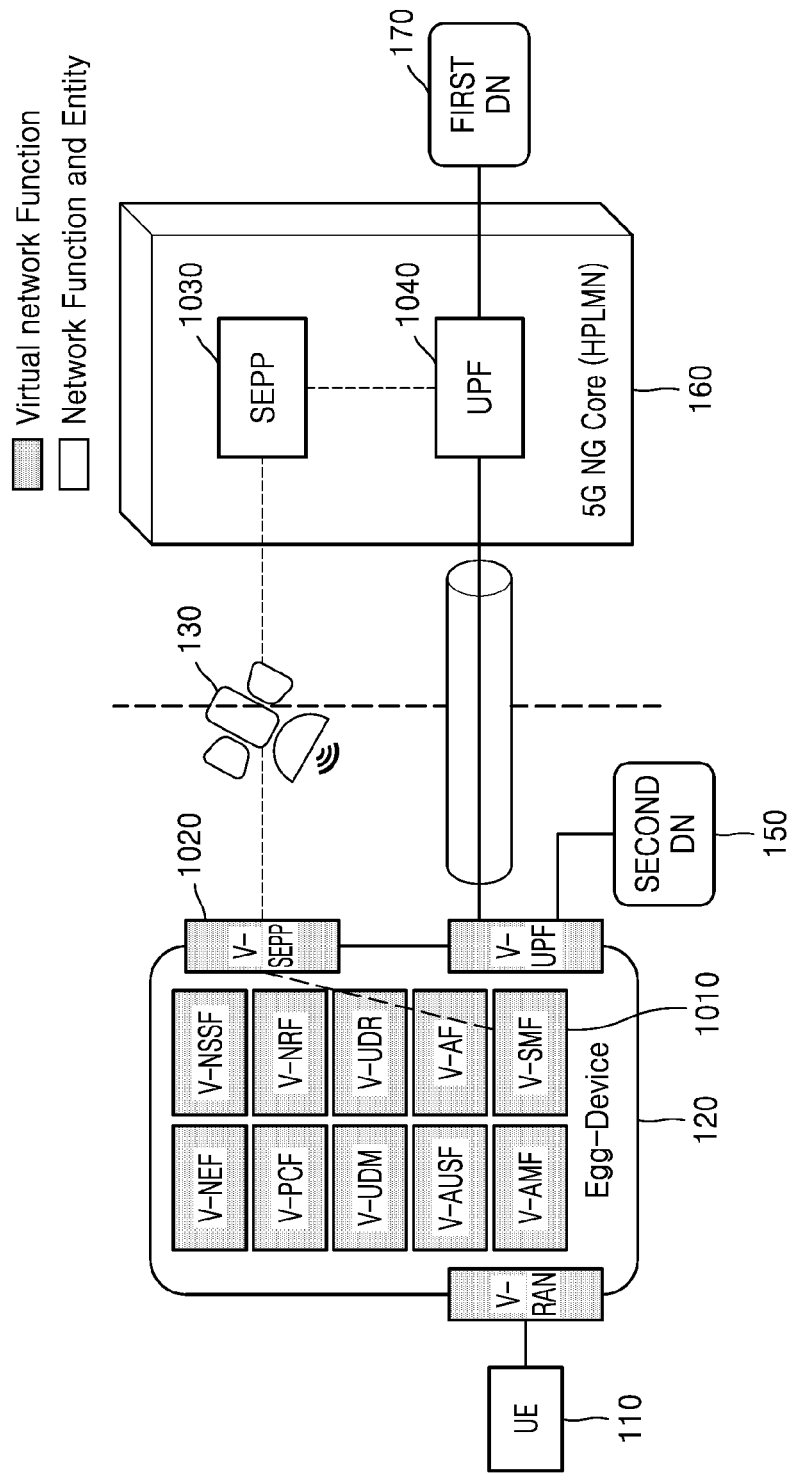
FIG. 10 is a diagram schematically showing a method for establishing a protocol data unit (PDU) session between a virtual user plane function (V-UPF) of an electronic device and a UPF of a core network, according to an embodiment.

FIG. 10 is a diagram schematically showing a method for establishing a protocol data unit (PDU) session between a V-UPF of an electronic device and a UPF of a core network, according to an embodiment.

Referring to FIG. 10, the electronic device 120 may be an egg-device corresponding to a portable mobile device, and the core network 160 may be an HPLMN. However, this is only an example for convenience of description, and an electronic device and a core network may be an electronic device and a core network other than the portable mobile device and the HPLMN, respectively. According to an embodiment, a signaling procedure for establishing a PDU session may be processed entirely or mostly in a portable mobile core in the electronic device 120. The electronic device 120 may establish the PDU session with the UE 110 and establish an N4 session between the V-UPF of the electronic device 120 and the UPF of the first core network.

According to an embodiment, a V-SMF 1010 of the electronic device 120 may transmit an N4 session establishment or change request to the V-UPF of the electronic device 120 or a V-SEPP 1020 of the electronic device 120. Also, the V-SEPP 1020 of the electronic device 120 may transmit the N4 session establishment or change request to a SEPP 1030 of the core network 160 through the satellite communication 130. The N4 session may be established as the SEPP 1030 of the core network 160 transmits the received N4 session establishment or change request to a UPF 1040 of the core network 160.

According to an embodiment, the electronic device 120 may establish the PDU session with the UE 110 and establish the N4 session between the V-UPF of the electronic device 120 and the UPF of the first core network, and then transmit a packet received from the UE 110 to the core network 160 connected to the first DN 170 or to the second DN 150. For example, when the electronic device 120 is used for a roaming service, the electronic device 120 may examine the packet received from the UE 110, and when the packet is not a packet related to a domestic only service, transmit the packet to the UPF of the second core network connected to the second DN 150, and when the packet is the packet related to the domestic only service, transmit the packet to the UPF 1040 of the first core network 160 connected to the first DN 170 through tunneling. According to an embodiment, the electronic device 120 may examine the packet and transmit the packet through different paths depending on a result of filtering, thereby reducing an average of latency and allowing a user to use the domestic only service without additional help, such as a private VPN or the like.

Figure 11:
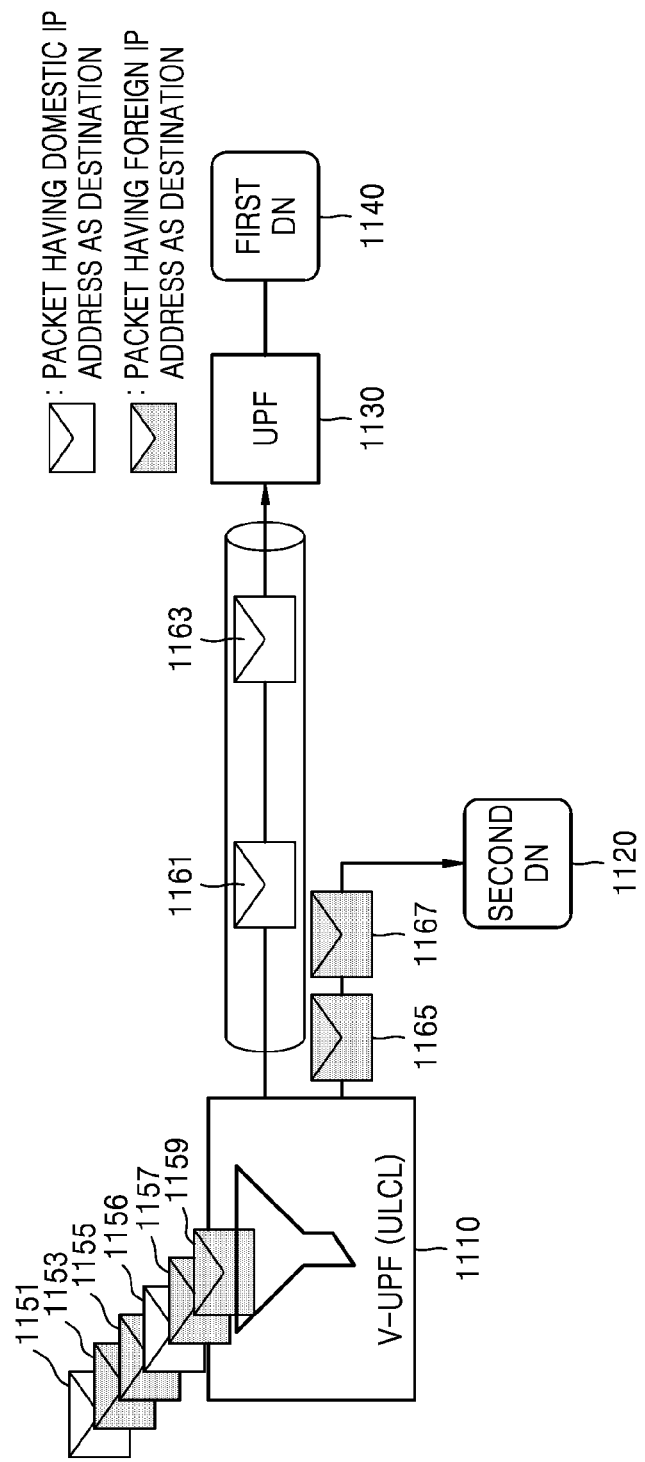
FIG. 11 is a diagram schematically showing a method, performed by an electronic device, for transmitting a packet received from a UE through any one of a plurality of paths by checking the received packet, according to an embodiment.

FIG. 11 is a diagram schematically showing a method, performed by an electronic device, for transmitting a packet received from a UE through any one of a plurality of paths by checking the received packet, according to an embodiment.

Referring to FIG. 11, a V-UPF 1110 of the electronic device may select a packet according to traffic, to transmit a data packet. According to an embodiment, the V-UPF 1110 of the electronic device may perform deep packet inspection (DPI) or may receive a traffic filter regarding an IP address band assigned to a first DN 1140 from the V-SMF of the electronic device without the DPI. The V-UPF 1110 of the electronic device may identify an IP address of a destination of the packet through the traffic filter, and the packet having the IP address of the destination assigned to the first DN 1140 may be transmitted to a UPF 1130 of a first core network and other packets may be transmitted to a second DN 1120.

For example, when the electronic device is used for a roaming service, a V-SMF of the electronic device may provide, to a V-UPF 1100 of the electronic device, a traffic filter regarding an IP address band assigned domestically. The V-UPF 1100 of the electronic device may identify the IP address of the destination of the packet, and when the destinations are packets 1151, 1156, 1161, and 1163 having domestic IP addresses through the traffic filter, transmit the packet to the UPF 1130 of the home core network such that the packet is transmitted to the first DN 1140 that is a domestic DN. On the other hand, when the destinations are packets 1153, 1155, 1157, 1159, 1165, and 1167 not having the domestic IP addresses, the V-UPF 1100 of the electronic device may transmit the packet to the second DN 1120 that is a DN of a visited area.

As another example, when the electronic device is used for load distribution in a traffic congested area, the V-UPF 1100 of the electronic device may determine a path where traffic is concentrated from among a first path between the UPF 1130 of the first core network and the electronic device and a second path between the UPF of a second core network and the electronic device, and transmit the packet according to a result of the determination. According to an embodiment, the second DN 1120 may receive the packet from the V-UPF through the UPF of the second core network.

Figure 12:
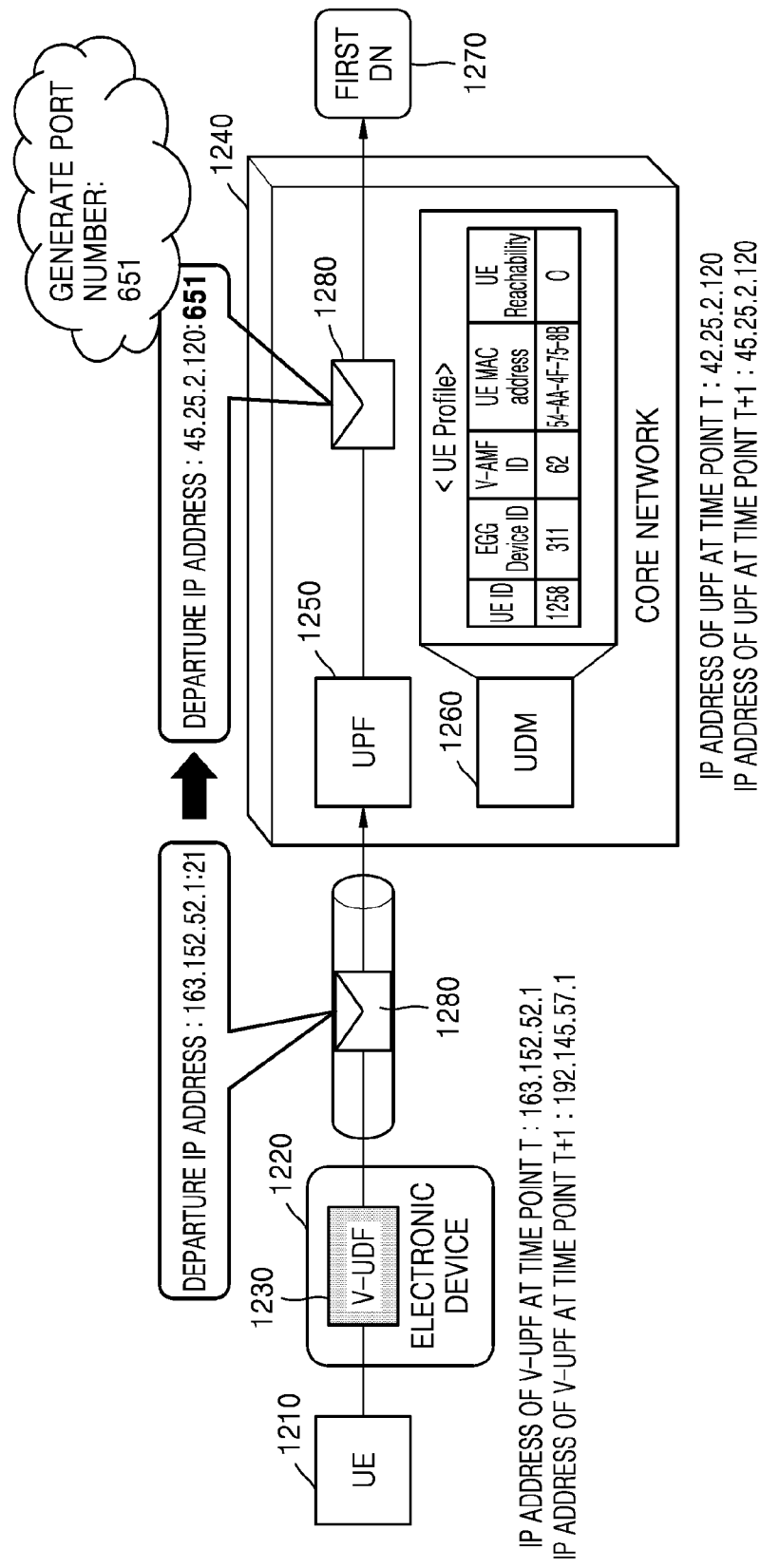
FIG. 12 is a diagram schematically showing a method, performed by a core network, for generating a port number corresponding to a UE and transmitting a packet to an electronic device based on the port number, according to an embodiment.

FIG. 12 is a diagram schematically showing a method, performed by a core network, for generating a port number corresponding to a UE and transmitting a packet to an electronic device, based on the port number, according to an embodiment.

Referring to FIG. 12, a UPF 1250 of a core network 1240 may receive a data packet 1280 from a V-UPF 1230 of an electronic device 1220, and an SMF of the core network 1240 may generate port numbers for identifying a UE and an electronic device from a UE profile corresponding to UE information of a UDM 1260 of the core network 1240, based on an identifier (for example, ID) of the electronic device 1220, an MAC address of a UE 1210, and the like. Also, the SMF of the core network 1240 may generate a traffic filter and provide the traffic filter together with the port number, to the UPF 1250 of the core network 1240.

According to an embodiment, the UPF 1250 of the core network 1240 may identify the identifier of the electronic device 1220 and the MAC address of the UE 1210 of the data packet 1280, and when a packet matches the traffic filter, transmit the data packet 1280 to a first DN 1270 by inserting the port number to a departure IP address. According to an embodiment, even when an IP address of the V-UPF 1230 of the electronic device 1220 is changed in a state in which the UPF 1250 of the core network 1240 has not received a response after transmitting the data packet 1280 to the first DN 1270, the UE 1210 may receive the data packet 1280 from the electronic device 1220 as the UPF 1250 of the core network 1240 identifies the changed IP address of the electronic device 1220 through the port number, receives the data packet 1280 from the first DN 1270, and transmits the received data packet 1280 to the changed IP address.

For example, the UPF 1250 of the core network 1240 may receive the data packet 1280 at a time point t, wherein an IP address of the V-UPF 1230 is 163.152.52.1, from the V-UPF 1230 of the electronic device 1220. The UPF 1250 of the core network 1240 may transmit the data packet 1280 to the first DN 1270 by inserting a port number 651 for identifying the UE 1210 and the electronic device 1220 into an IP address 45.25.2.120 of the UPF 1250 of the core network 1240. According to an embodiment, the IP address of the V-UPF 1230 of the electronic device 1220 may be changed to 192.145.57.1 at a time point t+1 that is a time point when a response to the transmitted data packet 1280 is not received. When a response packet regarding the data packet 1280 that has been transmitted by the UPF 1250 of the core network 1240 is received from the first DN 1270 after the IP address of the V-UPF 1230 of the electronic device 1220 is changed to 192.145.57.1 at the time point t+1, the UPF 1250 of the core network 1240 may identify the changed IP address of the V-UPF 1230 of the electronic device 1220, based on the port number 651 and transmit the response packet to the UE 1210 through the electronic device 1220.

According to an embodiment, the core network 1240 may transmit, to the first DN 1270, a packet including an IP address of the UPF 1250 of the core network so as to receive the response packet from the first DN 1270 while generating the port number for identifying the electronic device 1220 and UE 1210, and thus the response packet may be transmitted to the UE 1210 through the electronic device 1220 even when the IP address of the V-UPF 1230 of the electronic device 1220 is changed.

Figure 13:
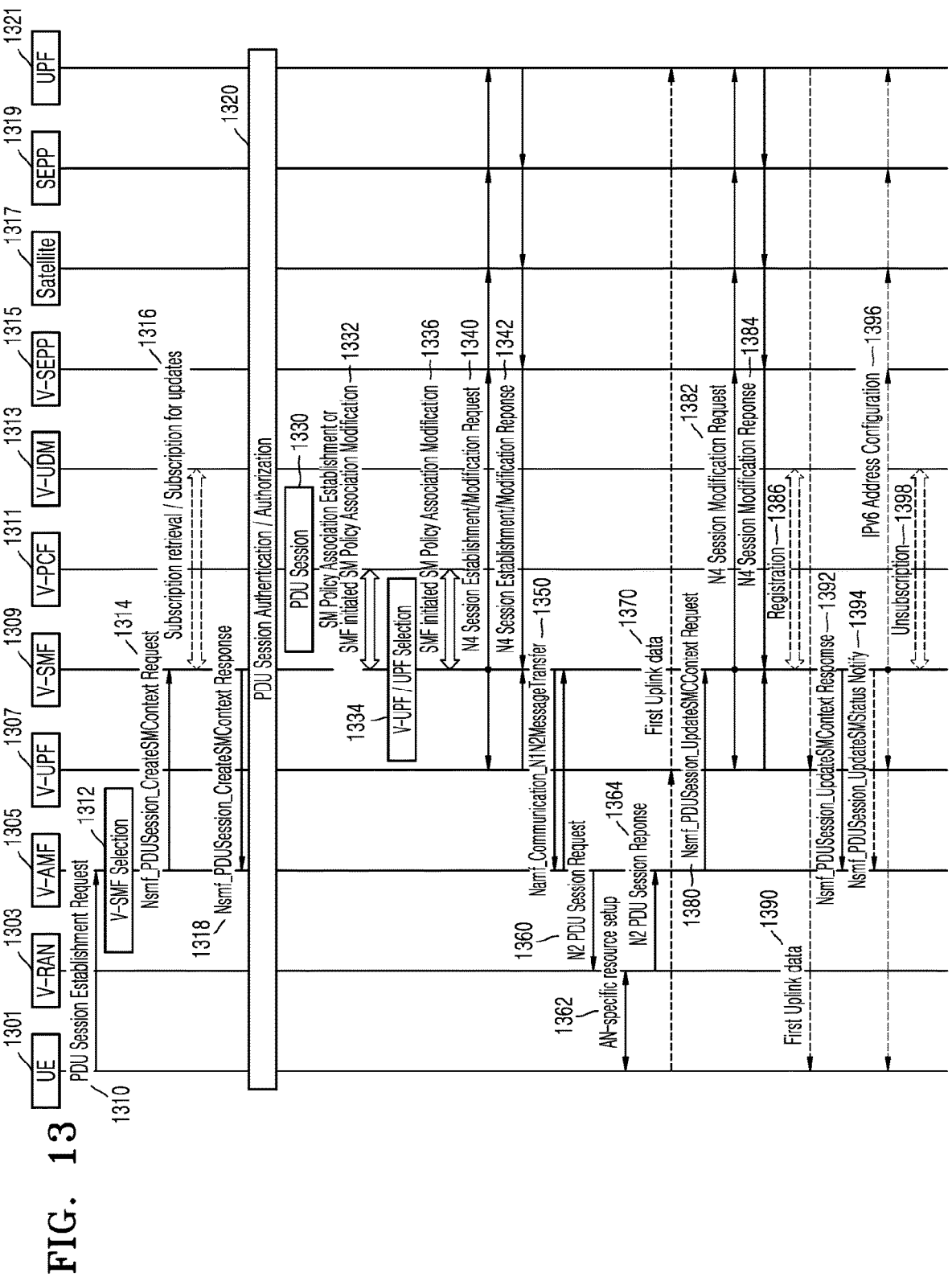
FIG. 13 is a flowchart showing a method, performed by an electronic device, for establishing a PDU session, receiving a packet from a UE and transmitting the packet to a core network, or receiving a packet from the core network and transmitting the packet to the UE, according to an embodiment.

FIG. 13 is a flowchart showing a method, performed by an electronic device, for establishing a PDU session, receiving a packet from a UE and transmitting the packet to a core network, or receiving a packet from the core network and transmitting the packet to the UE, according to an embodiment.

Referring to FIG. 13, a signaling procedure according to an embodiment may be performed by VNFs 1303, 1305, 1307, 1309, 1311, 1313, and 1315 of the electronic device, and thus the use of a communication satellite 1317 may be minimized. In operation 1310, a UE 1301 may transmit, to a V-AMF 1305 of the electronic device, a PDU session establishment request. In operation 1312, the V-AMF 1305 may perform SMF selection for assigning a V-SMF 1309 for managing a PDU session. In operation 1314, the V-AMF 1305 may perform the SMF selection to transmit an Nsmf_PDUsession_CreateSMContext request to the V-SMF 1309 determined to be a V-SMF for managing the PDU session. In operation 1316, the V-SMF 1309 may perform subscription retrieval for update, with a V-UDM 1313, based on the Nsmf_PDUsession_CreateSMContext request. In operation 1318, the V-SMF 1309 may transmit an Nsmf_PDUsession_CreateSMContext response. Accordingly, in operation 1320, the PDU session may be established between the UE 1301, the electronic device, and the core network.

In operation 1330 according to an embodiment, a virtual policy control function (V-PCF) 1311 of the electronic device may perform PCF selection. Accordingly, in operation 1332, the V-PCF 1311 of the electronic device may perform SM policy association establishment or SMF initiated SM policy association modification with the V-SMF 1309.

Operations 1334, 1336, 1340, and 1342 may indicate processes by which the V-SMF 1309 of the electronic device selects a V-UPF 1307 of the electronic device and an UPF 1321 of the core network to establish an N4 session. In operation 1334, the V-SMF 1309 of the electronic device may select the V-UPF 1307 of the electronic device and the UPF 1321 of the core network for establishing the N4 session.

In operation 1336, the V-SMF 1309 may perform the SMF initiated SM policy association modification with the V-PCF 1311. According to an embodiment, the V-SMF 1309 may transmit an Npcf_SMPolicyControl_Update request to the V-PCF 1311, and the V-PCF 1311 may determine a policy and transmit an Npcf_SMPolicyControl_Update response to the V-SMF 1309.

In operation 1340, the V-SMF 1309 may transmit an N4 session establishment/modification request to the V-UPF 1307 and a V-SEPP 1315, the V-SEPP 1315 may transmit the N4 session establishment/modification request received from the V-SMF 1309 to a SEPP 1319 of the core network through the communication satellite 1317, and the SEPP 1319 of the core network may transmit the N4 session establishment/modification request received from the V-SEPP 1315 to the UPF 1321 of the core network. In FIG. 13, it is assumed that the electronic device and the core network transmit/receive a signal through the communication satellite 1317 on a control plane, but this is only an example, and a communication method other than the communication satellite 1317, such as the Ethernet, Wi-Fi, or ad-hoc communication, may be used, and the other communication method is not limited thereto.

In operation 1342, the V-UPF 1307 of the electronic device and the UPF 1321 of the core network, which have received the N4 session establishment/modification request, may transmit an N4 session establishment/modification response to the V-SMF 1309 of the electronic device. According to an embodiment, the UPF 1321 of the core network may transmit the N4 session establishment/modification response to the SEPP 1319 of the core network, the SEPP 1319 of the core network may transmit the same to the V-SEPP 1315 of the electronic device through the communication satellite 1317, and the V-SEPP 1315 of the electronic device may transmit the received N4 session establishment/modification response to the V-UPF 1307. In FIG. 13, it is assumed that the electronic device and the core network transmit/receive a signal through the communication satellite 1317 on a control plane, but this is only an example, and a communication method other than the communication satellite 1317, such as the Ethernet, Wi-Fi, or ad-hoc communication, may be used, and the other communication method is not limited thereto.

In operation 1350, the V-SMF 1309 of the electronic device may transmit an Namf_Communication_N1N2MessageTransfer message to the V-AMF 1305 of the electronic device. According to an embodiment, the Namf_Communication_N1N2MessageTransfer message may include a multi-access (MA) PDU session permission indication. Also, the V-AMF 1305 may indicate the PDU session as an MA PDU session and notify the V-SMF 1309 of a result of the indication, based on the MA PDU session permission indication included in the Namf_Communication_N1N2MessageTransfer message received from the V-SMF 1309.

In operation 1360, the V-AMF 1305 of the electronic device may transmit an N2 PDU session request to a V-RAN 1303. In operation 1362, the V-RAN 1303 of the electronic device may set an AN-specific resource with the UE 1301, based on the N2 PDU session request received from the V-AMF 1305. Accordingly, the V-RAN 1303 may establish the N2 PDU session request with the UE 1301. In operation 1364, the V-RAN 1303 may transmit an N2 PDU session response to the V-AMF 1305 to notify that an N2 PDU session is established between the electronic device and the UE 1301.

In operation 1370, the UE 1301 may transmit first uplink data to the V-UPF 1307 of the electronic device, and the V-UPF 1307 may transmit uplink data to the UPF 1321 of the core network. According to an embodiment, when an IP of a destination is an IP assigned to a first DN, the electronic device may transmit data received from the UE 1301 to a first core network connected to the first DN, and when the IP of the destination is an IP assigned to a second DN, the electronic device may transmit the data to a second core network connected to the second DN.

In operation 1380, the V-AMF 1305 of the electronic device may transmit an Nsmf_PDUSession_UpdateSMContext request to the V-SMF 1309 of the electronic device. According to an embodiment, the Nsmf_PDUSession_UpdateSMContext request may update a connection between the V-AMF and the V-SMF to support the PDU session.

In operation 1382, upon receiving the Nsmf_PDUSession_UpdateSMContext request from the V-AMF 1305, the V-SMF 1309 may transmit an N4 session modification request to the V-UPF 1307 and the V-SEPP 1315, so as to transmit the N4 session modification request to the V-UPF 1307 of the electronic device and the UPF 1321 of the core network in operation 1382. The V-SEPP 1315 may transmit the received N4 session modification request to the SEPP 1319 of the core network through the communication satellite 1317. Also, the SEPP 1319 may finally transmit the received N4 session modification request to the UPF 1321 of the core network. In FIG. 13, it is assumed that the electronic device and the core network transmit/receive a signal through the communication satellite 1317 on a control plane, but this is only an example, and a communication method other than the communication satellite 1317, such as the Ethernet, Wi-Fi, or ad-hoc communication, may be used, and the other communication method is not limited thereto.

In operation 1384, the V-UPF 1307 of the electronic device and the UPF 1321 of the core network may transmit an N4 session modification response to the V-SMF 1309 of the electronic device. According to an embodiment, operation 1384 may correspond to operation 1342 described with reference to FIG. 13.

In operation 1386, the V-SMF 1309 of the electronic device and the V-UDM 1313 of the electronic device may register each other. In operation 1390, the UPF 1321 of the core network may transmit the first uplink data to the V-UPF 1307 of the electronic device. Also, the V-UPF 1307 of the electronic device may transmit the received first uplink data to the UE 1301. According to an embodiment, the UPF 1321 of the core network may transmit the first uplink data to the V-UPF 1307 of the electronic device, based on the port number generated in operation 1370.

In operation 1392, the V-SMF 1309 of the electronic device may transmit an Nsmf_PDUSession_UpdateSMContext response to the V-AMF 1305 of the electronic device. According to an embodiment, the Nsmf_PDUSession_UpdateSMContext response may be a response to the Nsmf_PDUSession_UpdateSMContext request received by the V-SMF 1309 in operation 1380.

In operation 1394, the V-SMF 1309 of the electronic device may transmit Nsmf_PDUSession_UpdateSMStatus Notify to the V-AMF 1305 of the electronic device. According to an embodiment, the Nsmf_PDUSession_UpdateSMStatus Notify may be used to notify a state of SM context related to the PDU session. For example, the state of SM context related to the PDU session may include session release caused by a local reason in the V-SMF 1309, PDU session handover to another system or access type, or the like.

In operation 1396, the V-SMF 1309 of the electronic device may transmit an IPv6 address configuration message to the V-UPF 1307 and the V-SEPP 1315 so as to notify the V-UPF 1307, UE 1301, and UPF 1321 of the core network of an IPv6 address configuration. According to an embodiment, the V-UPF 1307 may transmit the received IPv6 address configuration message to the UE 1301, the V-SEPP 1315 may transmit the received IPv6 address configuration message to the SEPP 1319 of the core network through the communication satellite 1317, and the SEPP 1319 may transmit the received IPv6 address configuration message to the UPF 1321. In FIG. 13, it is assumed that the electronic device and the core network transmit/receive a signal through the communication satellite 1317 on a control plane, but this is only an example, and a communication method other than the communication satellite 1317, such as the Ethernet, Wi-Fi, or ad-hoc communication, may be used, and the other communication method is not limited thereto. In operation 1398, the V-SMF 1309 may unsubscribe the V-SEPP 1315.

According to an embodiment, all or most signaling procedures excluding data transmission are performed by the VNFs in the electronic device, and thus the use of communication satellite 1317 may be minimized.

Figure 14:
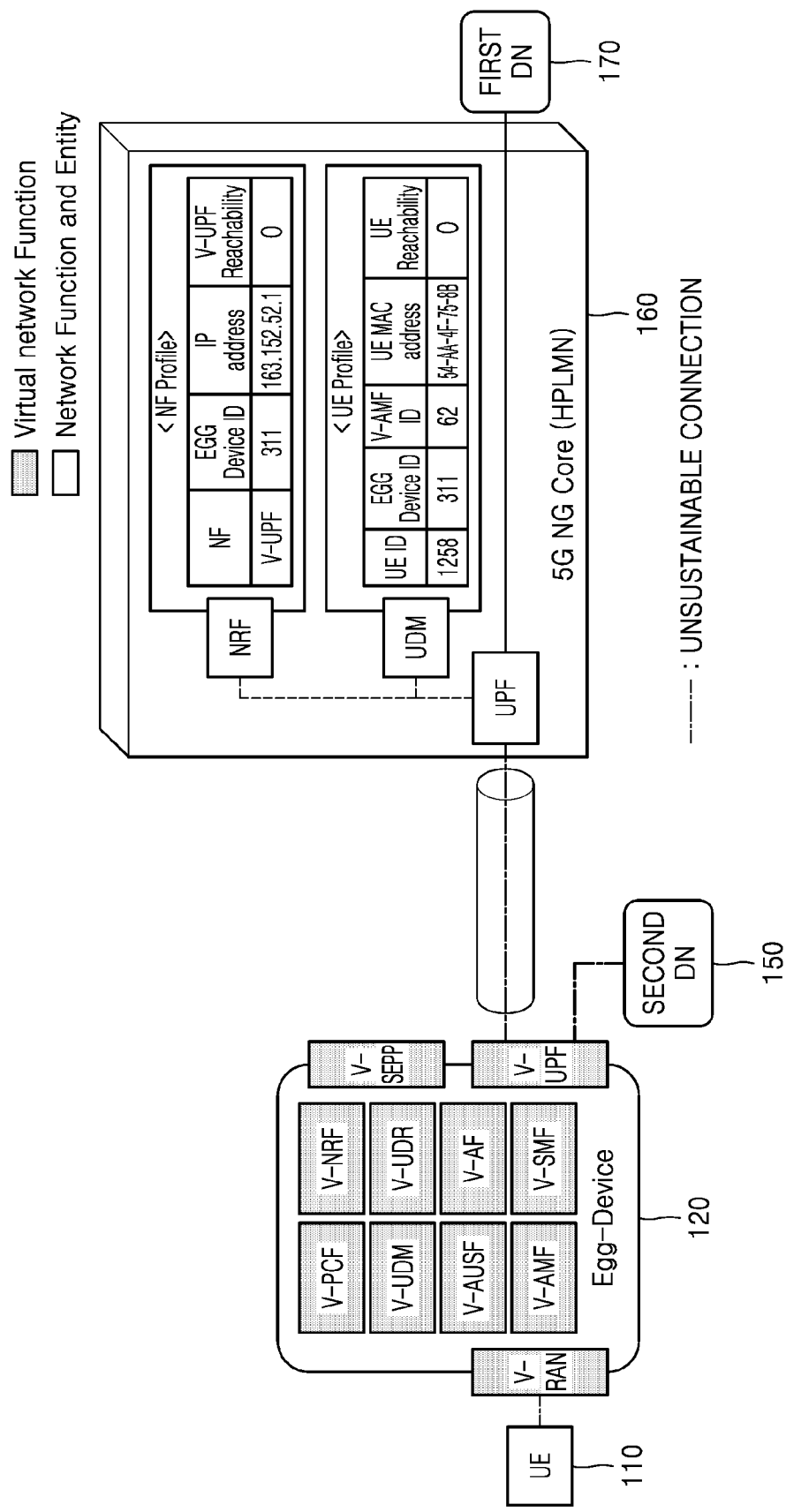
FIG. 14 is a schematic diagram showing a method, performed by a core network, for transmitting a packet to an electronic device, in consideration of a connection or disconnection between the core network and the electronic device, according to an embodiment.

FIG. 14 is a schematic diagram showing a method, performed by a core network, for transmitting a packet to an electronic device, in consideration of a connection or disconnection between the core network and the electronic device, according to an embodiment.

Referring to FIG. 14, the electronic device 120 may be an egg-device corresponding to a portable mobile device, and the core network 160 may be an HPLMN. However, this is only an example for convenience of description, and an electronic device and a core network may be an electronic device and a core network other than the portable mobile device and the HPLMN, respectively.

According to an embodiment, the UDM of the core network 160 may receive, from the electronic device 120, the UE information connected to the electronic device 120 and including the identifier of the UE 110, the identifier of the electronic device 120, an identifier of the V-AMF of the electronic device 120, and the MAC address of the UE 110, but information included in the UE information is not limited thereto. While storing the UE information, the UDM of the core network 160 may also store the identifier of the UE 110 (for example, UE ID), the MAC address of the UE 110, and the reachability information of the UE. The reachability information of the UE may include information about whether the UE and the electronic device are connected to each other. According to an embodiment, the UDM of the core network 160 may determine reachability of the UE, based on RM-registered/RM-deregistered state information, frequency availability of the UE 110, and the like received from the V-AMF of the electronic device 120. Accordingly, while storing the UE information, the UDM of the core network 160 may also store the reachability of the UE.

According to an embodiment, the UPF of the core network 160 may receive, from the V-UPF of the electronic device 120, the VNF information including the type of VNF, the identifier of the electronic device 120 (for example, an ID of the egg device), an IP address of the V-UPF of the electronic device 120, and the like. According to an embodiment, when there is a change in the VNF of the electronic device 120, the V-UPF of the electronic device 120 may transmit the update information to the UPF of the core network 160. In other words, when an IP address is newly assigned, the V-UPF of the electronic device 120 may transmit update information indicating the newly assigned IP address of the V-UPF to the UPF of the core network or periodically update the IP address of the V-UPF to the NRF. According to an embodiment, the NRF of the core network 160 may determine the reachability of the electronic device by receiving the VNF information from the UPF of the core network, and store an NF profile including the VNF type, the identifier of the electronic device, the IP address of the electronic device, and the reachability information of the electronic device. The reachability information of the electronic device may include information about whether the core network 160 and the electronic device 120 is connected to each other, the information being determined by the NRF. According to an embodiment, the NRF of the core network 160 may determine the reachability of the electronic device 120, based on a timeout of an update periodic timer of the V-UPF of the electronic device 120.

According to an embodiment, because the electronic device 120 and the UE 110 both have mobility, a connection between the UE 110 and the electronic device 120 and a connection between the electronic device 120 and the core network 160 may be unsustainable. Accordingly, the core network 160 may transmit a downlink packet to the electronic device, based on the reachability of the electronic device stored in the NRF and the reachability of the UE stored in the UDM. For example, when the core network 160 determines that there is the reachability of the electronic device, the core network 160 may transmit the downlink packet to the electronic device 120, and when the core network 160 determines that there is no reachability of the electronic device, the core network 160 may not transmit the downlink packet to the electronic device 120. As another example, when the core network 160 determines that there is the reachability of the electronic device, the core network 160 may transmit the downlink packet to the electronic device 120 together with the reachability information of the UE. Accordingly, when there is the reachability to the UE based on the received reachability information of the UE, the electronic device 120 may transmit the received downlink packet to the UE 110, and when there is no reachability to the UE, the electronic device 120 may not transmit the received downlink packet to the UE 110. According to an embodiment, the electronic device 120 receives the downlink packet based on the reachability of the UE 110 and the reachability of the electronic device 120, and thus unnecessary paging between the UE 110 and the V-RAN of the electronic device 120 is reduced, thereby improving battery efficiencies of the UE 110 and electronic device 120.

Figure 15:
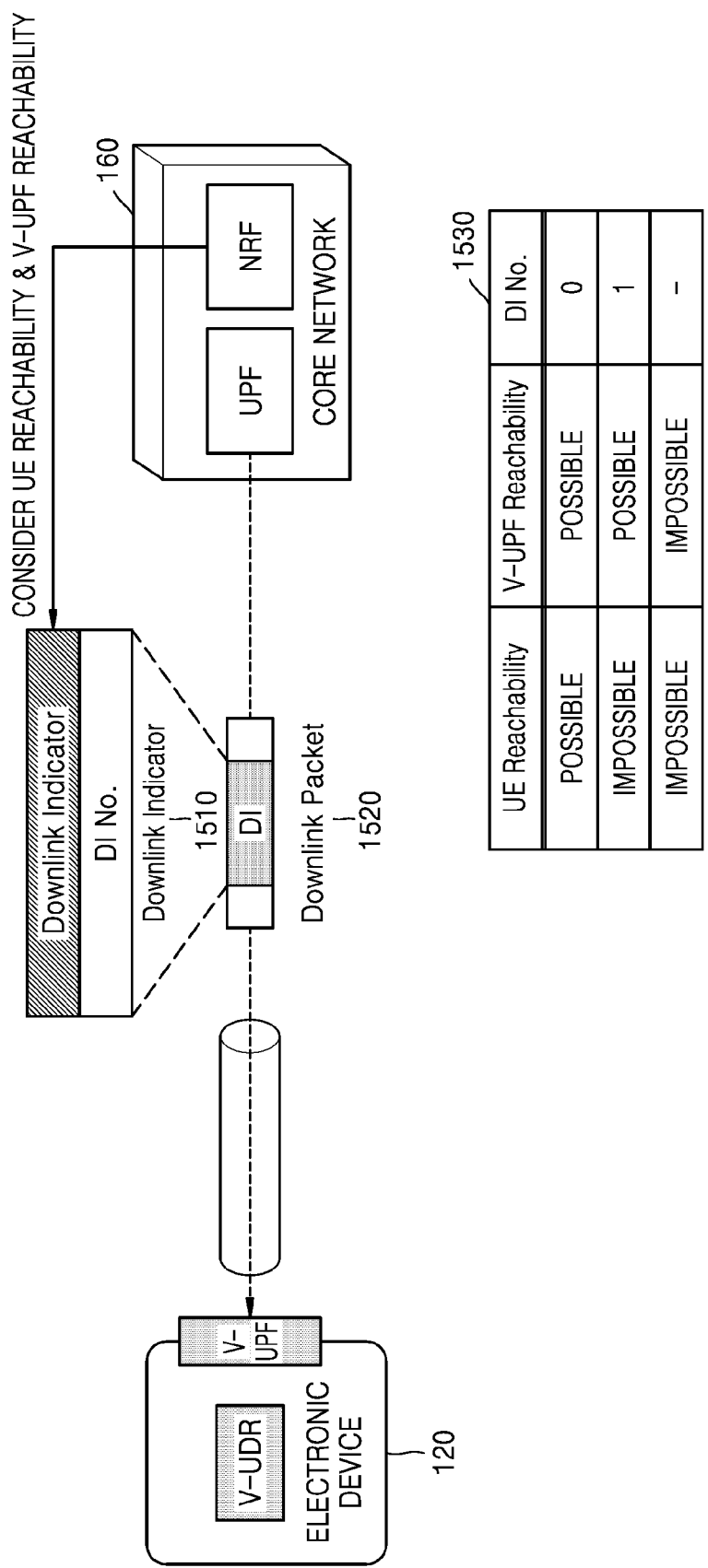
FIG. 15 is a schematic diagram showing a method, performed by a core network, for transmitting a downlink packet including a downlink indicator (DI), according to an embodiment.

FIG. 15 is a schematic diagram showing a method, performed by a core network, for transmitting a downlink packet including a downlink indicator (DI), according to an embodiment.

Referring to FIG. 15, the core network 160 may generate a DI 1520 and transmit, to the electronic device 120, the DI 1520 together with a downlink packet 1510 or the downlink packet 1510 by inserting the DI 1520 into the downlink packet 1510. According to an embodiment, the core network 160 may determine the DI 1520, based on reachability of the UE and reachability of an electronic device. For example, when it is determined that there is the reachability of the UE and reachability of a V-UPF of the electronic device, an NRF may determine the DI 1520 to be 0. As another example, when it is determined that there is no reachability of the UE and there is the reachability of the V-UPF of the electronic device, the NRF may determine the DI 1520 to be 1. As another example, when it is determined that there is no reachability of the UE and no reachability of the V-UPF of the electronic device, the NRF may not generate the DI 1520 and the UPF of the core network 160 may not transmit the downlink packet 1510 to the electronic device.

According to an embodiment, the core network 160 may transmit the downlink packet 1510 only when it is determined that there is the reachability of the electronic device. Also, the core network 160 transmits the downlink packet 1510 and the DI 1520 together or transmits the downlink packet 1510 by inserting the DI 1520 into the downlink packet 1510, such that the electronic device 120 is able to transmit the downlink packet 1510 only when the downlink packet 1510 is able to reach the UE 110.

Figure 16:
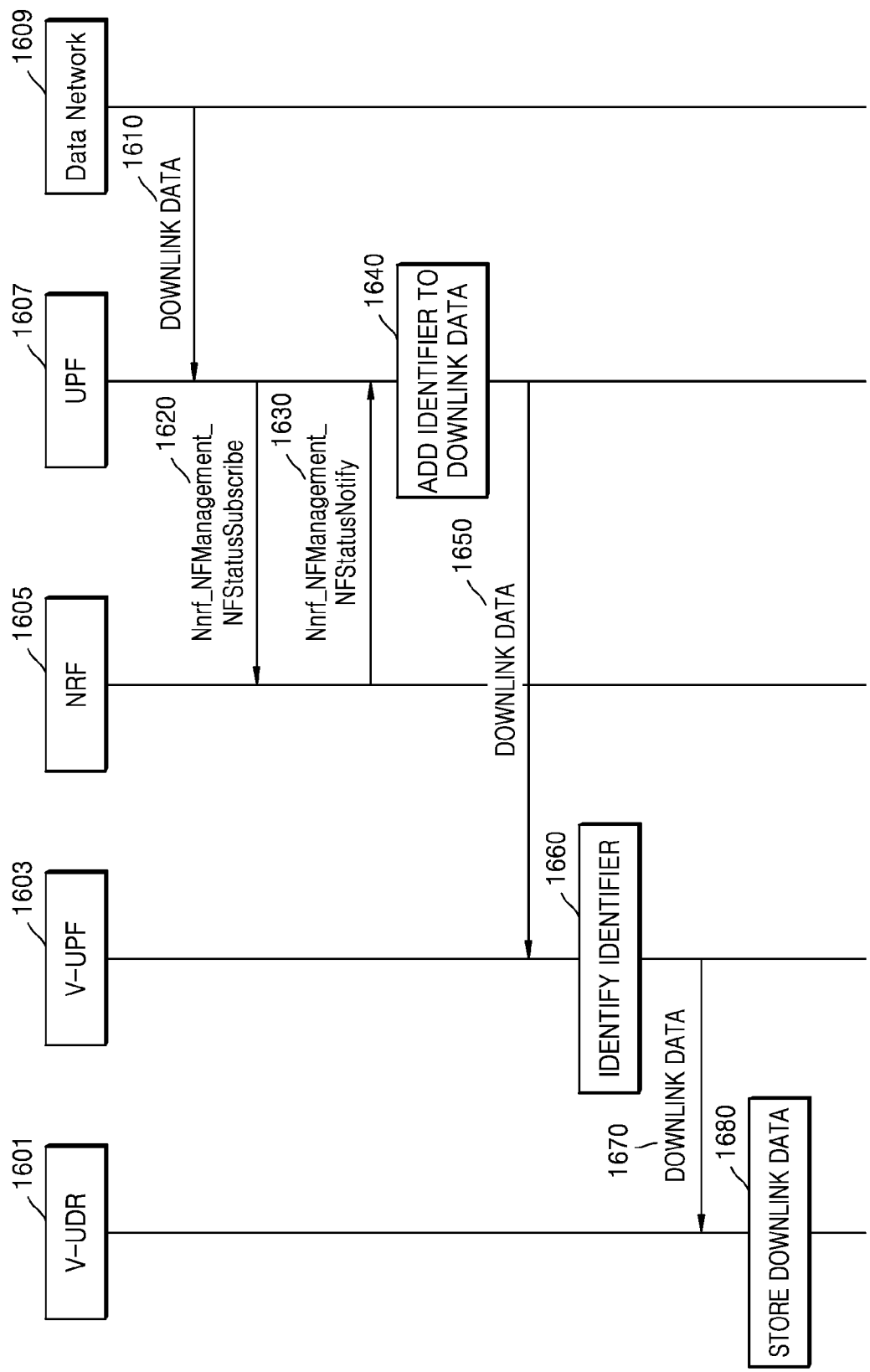
FIG. 16 is a flowchart showing a method for storing downlink data including a DI, in case that an electronic device is not connected to a UE, according to an embodiment.

FIG. 16 is a flowchart showing a method for storing downlink data including a DI, in case that an electronic device is not connected to a UE, according to an embodiment.

Referring to FIG. 16, in operation 1610, a DN 1609 may transmit downlink data to a UPF 1607 of a core network. According to an embodiment, the downlink data may be response data to uplink data transmitted to the DN 1609, the uplink data being received by the core network from the electronic device, but is not limited thereto.

In operation 1620, the UPF 1607 of the core network may transmit Nnrf_NFManagement_NFStatusSubscribe to an NRF 1605 of the core network. According to an embodiment, the UPF 1607 may transmit the Nnrf_NFManagement_NFStatusSubscribe to the NRF 1605 to subscribe reachability information of the UE, reachability information of the electronic device, and the like stored in the NRF 1605.

In operation 1630, the NRF 1605 of the core network may transmit Nnrf_NFManagement_NFStatusNotify to the UPF 1607 of the core network. According to an embodiment, in response to the Nnrf_NFManagement_NFStatusSubscribe that is a request for subscribing the reachability information of the UE, the reachability information of the electronic device, and the like stored in the NRF 1605, the UPF 1607 may transmit the Nnrf_NFManagement_NFStatusNotify indicating the reachability information of the UE, the reachability information of the electronic device, and the like.

In operation 1640, the UPF 1607 of the core network may add an identifier to the downlink data. According to an embodiment, the identifier is a DI and may include the reachability information of the UE, the reachability information of the electronic device, and the like, but is not limited thereto.

In operation 1650, the UPF 1607 of the core network may transmit the downlink data to which the identifier is added, to a V-UPF 1603 of the electronic device. According to an embodiment, the UPF 1607 of the core network may transmit the downlink data to which the identifier is added, to the V-UPF 1603 of the electronic device only when it is determined that there is reachability of the electronic device.

In operation 1660, the V-UPF 1603 of the electronic device may identify the identifier included in the downlink data. For example, when it is determined that there is reachability of the UE and reachability of the V-UPF of the electronic device, the NRF may determine the identifier to be 0, and when it is determined that there is no reachability of the UE and there is the reachability of the V-UPF of the electronic device, the NRF may determine the identifier to be 1. The V-UPF 1603 may identify the identifier included in the downlink data, when the identifier is 0, transmit the downlink data to the UE, and when the identifier is 1, perform operation 1670.

In operation 1670, the V-UPF 1603 of the electronic device may identify the identifier included in the downlink data, and when the identifier including information indicating that there is no reachability of the UE, transmit the downlink data to a V-DUR 1601 of the electronic device.

In operation 1680, the V-DUR 1601 of the electronic device may store the downlink data received from the V-UPF 1603. According to an embodiment, the downlink data stored by the V-DUR 1601 may be transmitted from the electronic device to the UE when the electronic device and the UE are connected to each other. According to an embodiment, when the electronic device and the UE are not connected to each other, the electronic device may use the identifier to reduce unnecessary paging between the UE and a V-RAN and improve battery efficiencies of the UE and electronic device.

Figure 17:
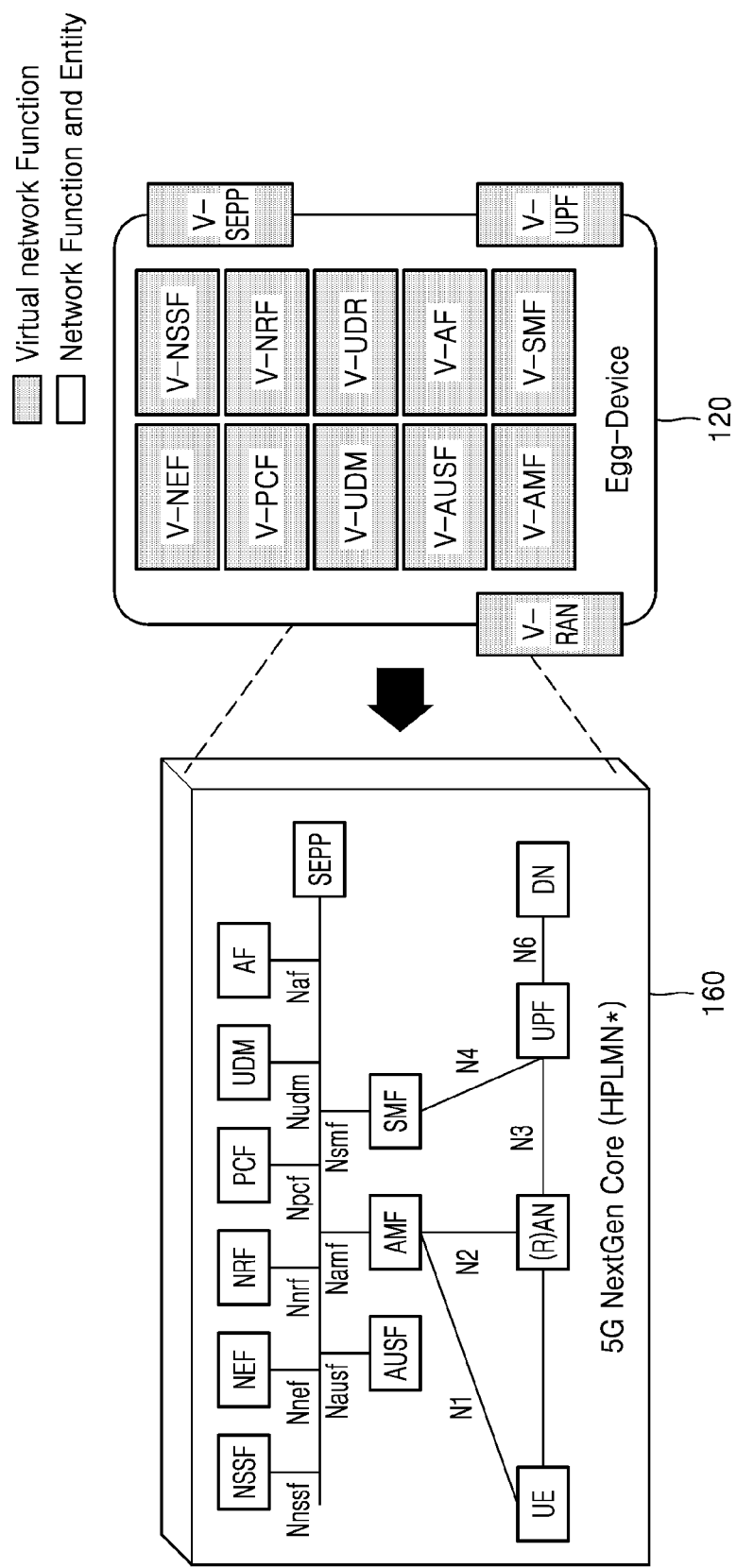
FIG. 17 is a schematic diagram showing a method for updating information of at least one VNF of an electronic device in a core network, according to an embodiment.

FIG. 17 is a schematic diagram showing a method for updating information of at least one VNF of an electronic device in a core network, according to an embodiment.

Referring to FIG. 17, a user may update VNF information to the core network 160 after using the electronic device 120. For example, when the user uses the electronic device 120 for a roaming service, the core network 160 may determine a VNF use amount of the electronic device 120 by updating the VNF information of the electronic device 120 to the core network 160 after the user returns to his/her country.

Figure 18:
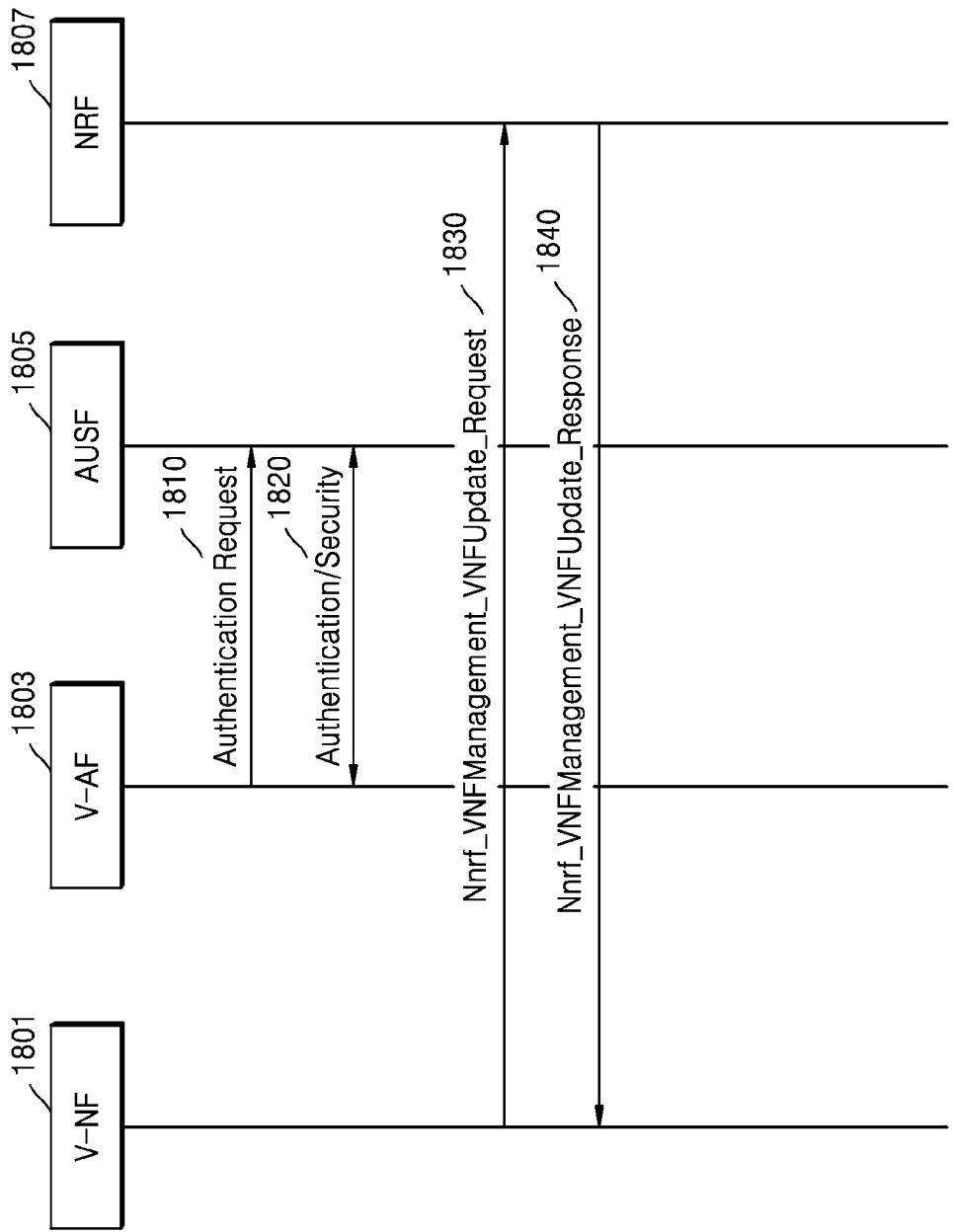
FIG. 18 is a flowchart showing a method for updating information of at least one VNF of an electronic device in a core network, according to an embodiment.

FIG. 18 is a flowchart showing a method for updating information of at least one VNF of an electronic device in a core network, according to an embodiment.

Referring to FIG. 18, in operation 1810, a V-AF 1803 of the electronic device may transmit an authentication request to an AUSF 1805 of the core network. In operation 1820, the V-AF 1803 of the electronic device and the AUSF 1805 of the core network may be in states in which authentication/security are performed on each other, based on the authentication request.

In operation 1830, a V-NF 1801 of the electronic device may transmit a Nnrf_VNFManagement_VNFUpdate request to an NRF 1807 of the core network. According to an embodiment, the V-NF 1801 of the electronic device may update a use amount of the V-NF 1801 of the electronic device to the core network by transmitting the Nnrf_VNF-Management_VNFUpdate request.

In operation 1840, the NRF 1807 of the core network may update the use amount of the V-NF 1801 of the electronic device to the core network and then transmit an Nnrf_VNF-Management_VNFUpdate response to the V-NF 1801 of the electronic device. According to an embodiment, the NRF 1807 of the core network may update the use amount of the V-NF 1801 of the electronic device to the core network, and thus a service provider may determine a use amount of a user and charge the user according to the use amount.

Figure 19:
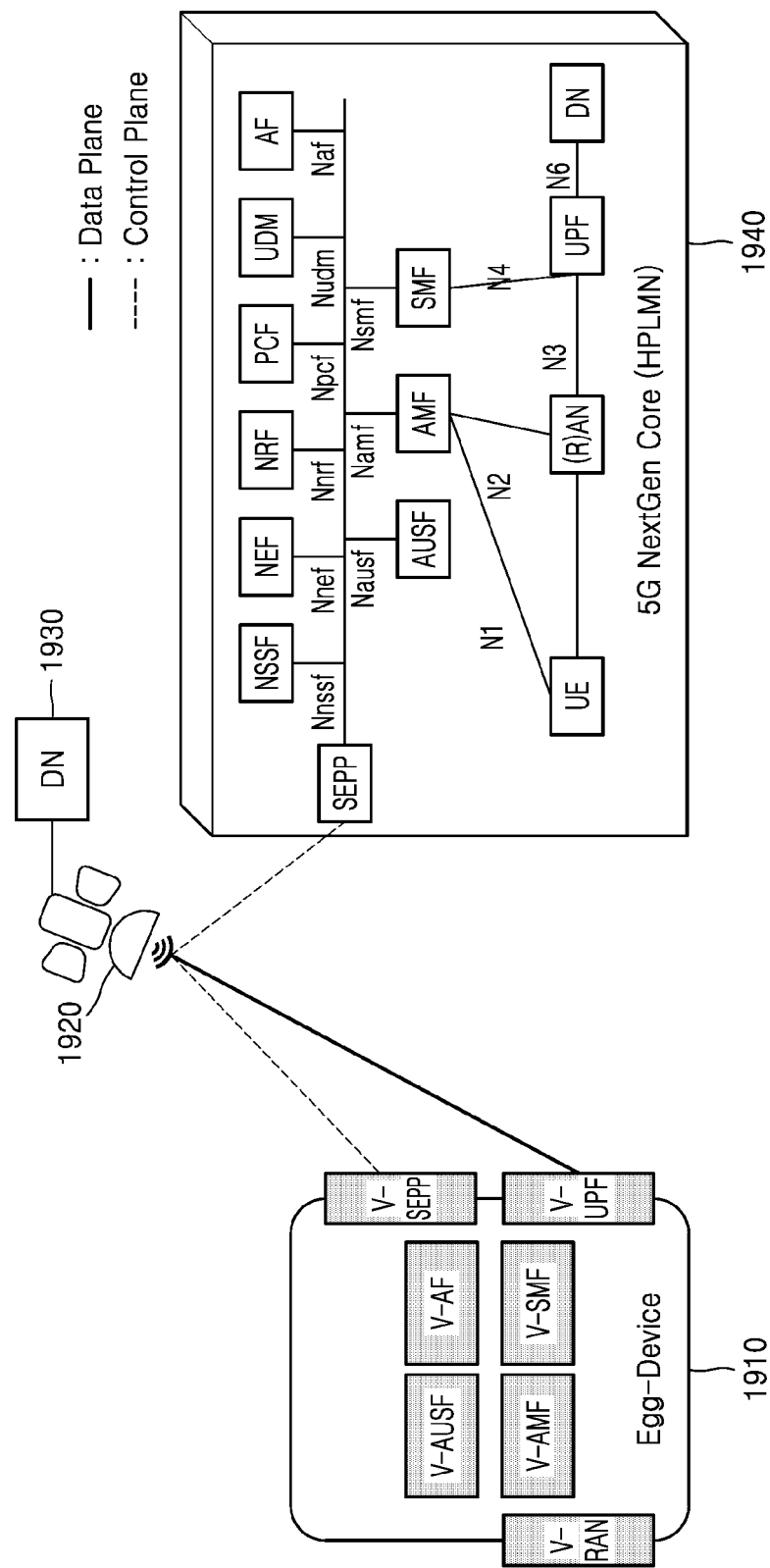
FIG. 19 is a schematic diagram showing a method, performed by an electronic device, for transmitting or receiving a data packet by using only at least one of a virtual authentication server function (V-AUSF), a virtual application function (V-AF), a virtual access and mobility management function (V-AMF), and a virtual session management function (V-SMF), according to an embodiment.

FIG. 19 is a schematic diagram showing a method, performed by an electronic device, for transmitting or receiving a data packet by using only at least one of a V-AUSF, a V-AF, a V-AMF, and a V-SMF, according to an embodiment.

Referring to FIG. 19, an electronic device 1910 may transmit, to an NEF of a core network 1940, an instance request regarding at least one of a V-AUSF, a V-AF, a V-AMF, and a V-SMF, receive, from an NEF, an instance response including information about at least one of the V-AUSF, the V-AF, the V-AMF, and the V-SMF, and provision a VNF including at least one of the V-AUSF, the V-AF, the V-AMF, and the V-SMF, based on the received instance response. According to an embodiment, the electronic device 1910 may an NF of the core network 1940 as an NF excluding the provisioned at least one VNF from among the V-AUSF, the V-AF, the V-AMF, and the V-SMF.

According to an embodiment, while performing a VNF instance process, the electronic device 1910 may instance only a VNF required according to a service to be provided by the electronic device 1910. For example, when the electronic device 1910 is used for load distribution in a congested area or communication support in a disaster area, the electronic device 1910 may need to store information, policies, and the like of all UEs. However, because a memory, a computing resource, and the like of the electronic device 1910 are limited, only a VNF including the V-AUSF, the V-AF, the V-AMF, and the V-SMF for an authentication procedure may be instanced to the electronic device 1910, according to a service characteristic. Also, an NF other than the instanced VNF may use an NF of the core network 1940. According to an embodiment, a control plane may use a communication satellite 1920 and a data plane may use a communication satellite or ad-hoc communication between electronic devices, but the control plane and data plane are not limited thereto.

According to an embodiment, when the electronic device 1910 is used for service support in a communication area of a disaster area, the electronic device 1910 may receive an IP address from the core network 1940 or another electronic device, and after the IP address is received, pieces of information of VNF of the electronic device 1910 may be registered in the core network 1940 and managed by the core network 1940. According to an embodiment, when the electronic device 1910 is connected to the core network 1940, the electronic device 1910 may transmit/receive a data packet to/from the core network 1940 by receiving the IP address from the core network 1940. According to another embodiment, when the electronic device 1910 is connected to another electronic device, the electronic device 1910 may receive an IP address of the other electronic device and transmit/receive a data packet to/from the other electronic device.

According to an embodiment, when the electronic device 1910 is used for the service support in the communication area of the disaster area, a process of selecting traffic by a traffic filter or generating a port number to identify a UE may be omitted. Also, a V-UPF of the electronic device 1910 may operate in the same manner as a UPF of the core network 1940. In other words, to support communication between UEs connected to different electronic devices in the disaster area, tunneling between V-UPFs of the different electronic devices may be generated for communication. For example, for a UE connected to the electronic device 1910 to communicate with the outside, the UE may communicate through tunneling formed between the V-UPF of the electronic device 1910 and the UPF of the core network 1940, or the V-UPF may operate as a PDU session anchor (PSA) such that data is directly transmitted/received to/from a DN 1930 through the communication satellite 1920.

Figure 20:
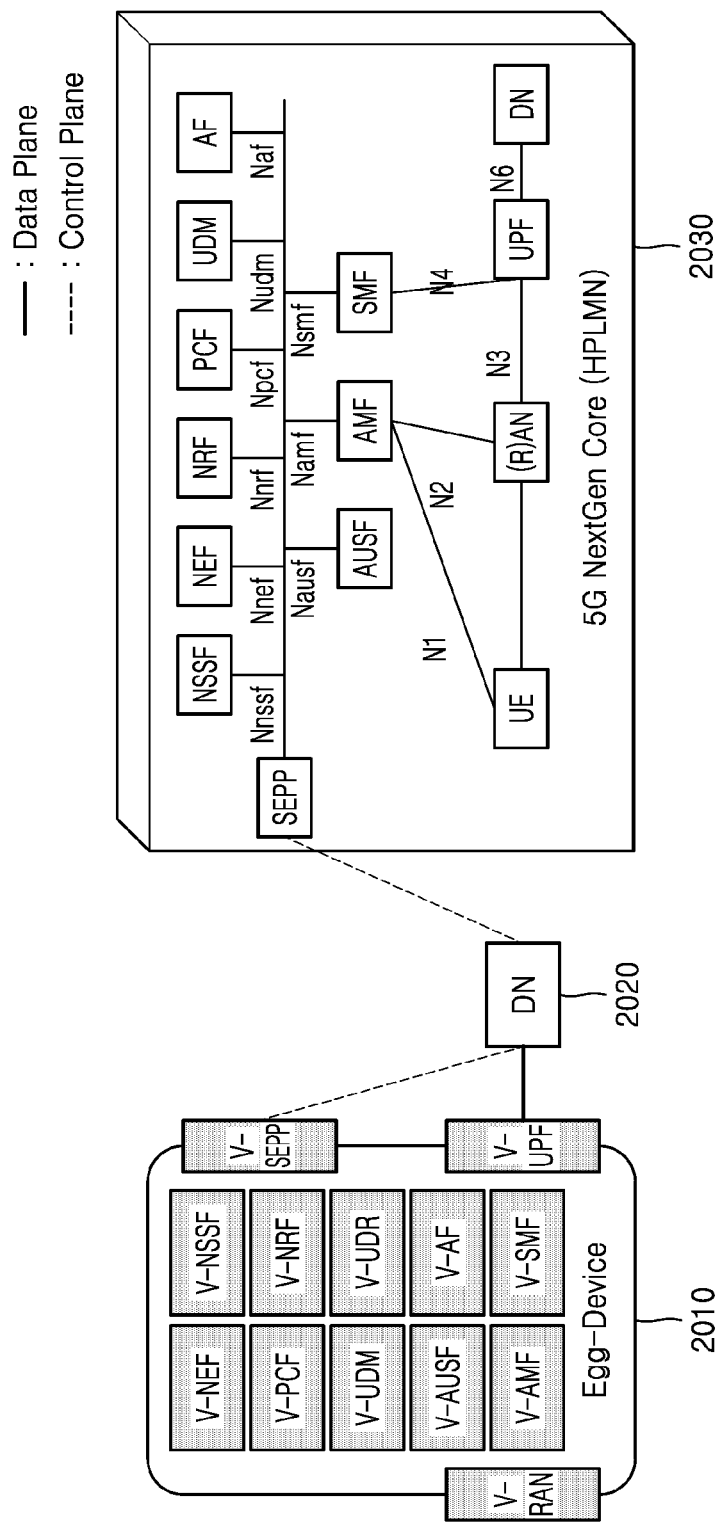
FIG. 20 is a schematic diagram showing a method, performed by an electronic device, for transmitting or receiving a data packet by using all VNFs, according to an embodiment.

FIG. 20 is a schematic diagram showing a method, performed by an electronic device, for transmitting or receiving a data packet by using all VNFs, according to an embodiment.

Referring to FIG. 20, an electronic device 2010 includes all NFs of a core network 2030 after virtualizing the same, and Wi-Fi or the Ethernet may be used on a control plane and a data plane. According to an embodiment, VNFs of the electronic device 2010 may perform update or synchronization via communication with the core network 2030, only when necessary. According to an embodiment, the electronic device 2010 may be used to arrange a small cell, such as a home cell.

Figure 21:
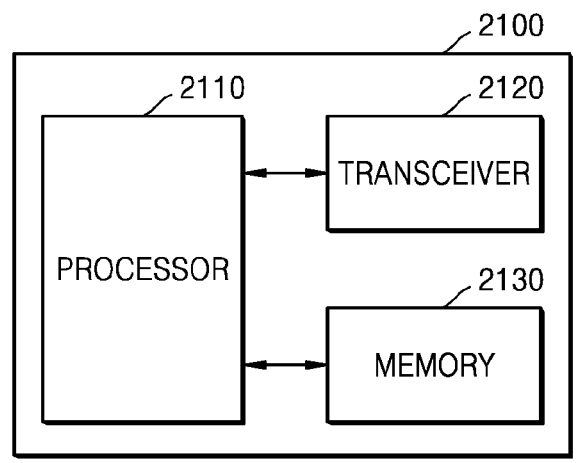
FIG. 21 is a diagram showing an internal structure of an electronic device, according to an embodiment.

FIG. 21 is a diagram showing an internal structure of an electronic device, according to an embodiment.

Referring to FIG. 21, an electronic device 2100 may include a processor 2110, a transceiver 2120, and a memory 2130. The processor 2110, the transceiver 2120, and the memory 2130 of the electronic device 2100 may operate according to a communication method of the electronic device 2100 described above. However, the components shown in FIG. 21 are not all essential components of the electronic device 2100. The electronic device 2100 may be implemented by more components than those shown in FIG. 21 or may be implemented by fewer components than those shown in FIG. 21. In addition, the processor 2110, the transceiver 2120, and the memory 2130 may be implemented in a form of one chip.

According to an embodiment, the processor 2110 may control overall operations of the electronic device 2100 and include at least one processor, such as a central processing unit (CPU) or a graphics processing unit (GPU). The processor 2110 may control other components included in the electronic device 2100 to perform an operation for operating the electronic device 2100. For example, the processor 2110 may execute a program stored in the memory 2130, read a file stored in the memory 2130, or store a new file in the memory 2130. According to an embodiment, the processor 2110 may execute a program stored in the memory 2130 to perform an operation for operating the electronic device 2100. For example, the processor 2110 may provision at least one VNF corresponding to some or all of a plurality of NFs included in a first core network, register the provisioned at least one VNF in the first core network, receive a first packet from a UE, determine a path for transmitting the first packet from among a first path between a UPF of the first core network and the electronic device 2100 and a second path between a UPF of a second core network and the electronic device 2100, and transmit the first packet through the determined path.

According to an embodiment, the transceiver 2120 may communicate with the UE, a core network, or another electronic device connected to the electronic device 2100 wirelessly or via wires. For example, the transceiver 2120 may transmit a VNF instance request to an NEF of the first core network, and receive an instance response including a plurality of pieces of NF information from the NEF. As another example, the transceiver 2120 may transmit an AVRI from a V-SEPP of the electronic device 2100 to a SEPP of the first core network, and receive, from the first core network, a registration response indicating that the at least one VNF has been registered in the first core network.

According to an embodiment, a program such as an application and various types of data such as a file may be installed and stored in the memory 2130. The processor 2110 may access and use data stored in the memory 2130 or may store new data in the memory 2130. According to an embodiment, the memory 2130 may include a database.

Figure 22:
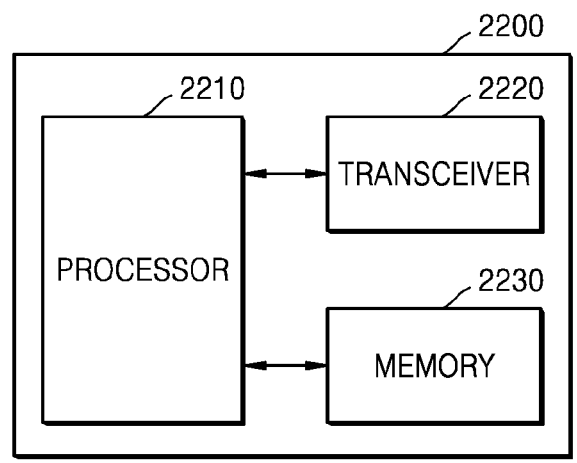
FIG. 22 is a diagram showing an internal structure of a network entity included in a core network, according to an embodiment.

FIG. 22 is a diagram showing an internal structure of a network entity included in a core network, according to an embodiment.

Referring to FIG. 22, a network entity 2200 may include a processor 2210, a transceiver 2220, and a memory 2230. The processor 2210, the transceiver 2220, and the memory 2230 of the network entity 2200 may operate according to a communication method of the network entity 2200 included in a core network described above. However, the components shown in FIG. 22 are not all essential components of the network entity 2200. The network entity 2200 may be implemented by more components than those shown in FIG. 22 or may be implemented by fewer components than those shown in FIG. 22. In addition, the processor 2210, the transceiver 2220, and the memory 2230 may be implemented in a form of one chip. According to an embodiment, the network entity 2200 may include a network slice selection function (NSSF), an NEF, an NRF, a PCF, a UDR, a UDM, an AF, a SEPP, an AUSF, an AMF, an SMF, and a UPF. However, the network entity 2200 is not limited thereto.

According to an embodiment, the processor 2210 may control overall operations of the network entity 2200 and include at least one processor, such as a CPU or a (GPU. The processor 2210 may control other components included in the network entity 2200 to perform an operation for operating the network entity 2200. For example, the processor 2210 may transmit and receive signals via the transceiver 2220. Also, the processor 2210 may record and read data on and from the memory 2230. In this regard, the processor 2210 may include at least one processor. The processor 2210 may control the network entity 2200 to perform operations according to various embodiments described above. For example, components of the network entity 2200 may be controlled to directly perform the operations according to embodiments of the present disclosure. For example, the processor 2210 may execute a program stored in the memory 2230, read a file stored in the memory 2230, or store a new file in the memory 2230. According to an embodiment, the processor 2210 may execute a program stored in the memory 2230 to perform an operation for operating the network entity 2200. For example, the processor 2210 may receive, from a UDM, UE information including at least one of an identifier of a UE and an MAC address of the UE, generate a port number corresponding to the UE based on the UE information, and transmit a packet to an electronic device capable of transmitting a packet to the UE, based on the generated port number.

According to an embodiment, the transceiver 2220 may provide an interface for performing communication with other devices in a network. In other words, the transceiver 2220 converts a bit string transmitted from the network entity 2200 to another device into a physical signal and converts a physical signal received from another device into a bit string. In other words, the transceiver 2220 may transmit or receive a signal. In this regard, the transceiver 2220 may be referred to as a modem, a transmitter, a receiver, a communication unit, or a communication module. Here, the transceiver 2220 enables the network entity 2200 to communicate with other devices or system via a backhaul connection (for example, wired backhaul or wireless backhaul) or another connection method.

According to an embodiment, the memory 2230 may store a basic program, an application program, and data such as configuration information, for operations of the network entity. The memory 2230 may be configured in a volatile memory, a nonvolatile memory, or a combination of a volatile memory and a nonvolatile memory. Also, the memory 2230 may provide the stored data upon request by the processor 2210.

The methods according to the embodiments of the present disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to specific embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment of the present disclosure and a portion of another embodiment of the present disclosure may be combined with each other. In addition, modified examples of the embodiments based on the technical ideas of the embodiments may be implemented in other systems, such as LTE systems, 5G or NR communication systems.

What is claimed is:

1. An operation method of an electronic device capable of communicating with a first core network, a second core network, and a user equipment (UE), the operation method comprising:
   provisioning at least one virtual network function (VNF) corresponding to some or all of a plurality of network functions (NFs) included in the first core network;
   generating an aggregated VNF register indicator (AVRI) including information about the provisioned at least one VNF;
   transmitting the generated AVRI from a virtual security edge protection proxy (V-SEPP) of the electronic device to a security edge protection proxy (SEPP) of the first core network; and
   receiving, from the first core network, a registration response indicating that the at least one VNF has been registered in the first core network;
   receiving a first packet from the UE and determining a path through which the first packet is to be transmitted, from among a first path between a user plane function (UPF) of the first core network and the electronic device and a second path between a UPF of the second core network and the electronic device; and
   transmitting the first packet through the determined path.

2. The operation method of claim 1, wherein the determining of the path through which the first packet is to be transmitted comprises:
   filtering the first packet received from the UE, based on at least one of a latency requirement, a type of service, an internet protocol (IP) address of a destination of the first packet, or a traffic amount; and
   determining the path through which the first packet is to be transmitted, from among the first path and the second path, based on a result of the filtering.

3. The operation method of claim 1, wherein the provisioning of the at least one VNF comprises:
   transmitting a VNF instance request to a network exposure function (NEF) of the first core network;
   receiving, from the NEF, an instance response including a plurality of pieces of NF information; and
   provisioning the at least one VNF corresponding to some or all of the plurality of NFS, based on the received instance response.

4. The operation method of claim 1, further comprising:
   transmitting, to unified data management (UDM) of the first core network, UE information including at least one of an identifier of the electronic device or a media access control (MAC) address of the UE;
   transmitting, to a network repository function (NRF) of the first core network, VNF information including at least one of the identifier of the electronic device or an internet protocol (IP) address of a virtual user plane function (V-UPF) of the electronic device; and
   in case that a VNF of the electronic device changes, transmitting update information to the NRF of the first core network.

5. An electronic device capable of communicating with a first core network, a second core network, and a user equipment (UE), the electronic device comprising:
   a transceiver;
   a memory storing one or more instructions; and
   at least one processor configured to execute the one or more instructions stored in the memory, wherein the at least one processor is further configured to:
   provision at least one virtual network function (VNF) corresponding to some or all of a plurality of network functions (NFs) included in the first core network;
   generate an aggregated VNF register indicator (AVRI) including information about the provisioned at least one VNF;
   transmit the generated AVRI from a virtual security edge protection proxy (V-SEPP) of the electronic device to a security edge protection proxy (SEPP) of the first core network;
   receive, from the first core network, a registration response indicating that the at least one VNF has been registered in the first core network;
   receive a first packet from the UE and determine a path through which the first packet is to be transmitted, from among a first path between a user plane function (UPF) of the first core network and the electronic device and a second path between a UPF of the second core network and the electronic device; and
   transmit the first packet through the determined path.

6. The electronic device of claim 5, wherein the at least one processor is further configured to:
   filter the first packet received from the UE, based on at least one of a latency requirement, a type of service, an internet protocol (IP) address of a destination of the first packet, and a traffic amount; and
   determine the path through which the first packet is to be transmitted, from among the first path or the second path, based on a result of the filtering.

7. The electronic device of claim 5, wherein the at least one processor is further configured to:
   transmit a VNF instance request to a network exposure function (NEF) of the first core network;
   receive, from the NEF, an instance response including a plurality of pieces of NF information; and
   provision the at least one VNF corresponding to some or all of the plurality of NFs, based on the received instance response.

8. The electronic device of claim 5, wherein the at least one processor is further configured to:

transmit, to unified data management (UDM) of the first core network, UE information including at least one of an identifier of the electronic device or a media access control (MAC) address of the UE;

transmit, to a network repository function (NRF) of the first core network, VNF information including at least one of the identifier of the electronic device or an internet protocol (IP) address of a virtual user plane function (V-UPF) of the electronic device; and in case that a VNF of the electronic device changes, transmit update information to the NRF of the first core network.

9. The electronic device of claim 8, wherein the at least one processor is further configured to:

establish a protocol data unit (PDU) session between the UE and the electronic device; and establish an N4 session between the V-UPF of the electronic device and the UPF of the first core network.

10. The electronic device of claim 5, wherein the at least one processor is further configured to:

receive, from the first core network, a second packet and a downlink indicator;

store the received downlink indicator in a virtual unified data repository (V-UDR); and transmit the second packet to the UE, based on the received downlink indicator, wherein the downlink indicator comprises information about whether the electronic device is capable of transmitting the second packet to the UE.

11. The electronic device of claim 5, wherein the at least one processor is further configured to:

transmit, to a network exposure function (NEF) of the first core network, an instance request regarding at least one of a virtual authentication server function (V-AUSF), a virtual application function (V-AF), a virtual access and mobility management function (V-AMF), or a virtual session management function (V-SMF);

receive, from the NEF, an instance response including information about at least one of the V-AUSF, the V-AF, the V-AMF, or the V-SMF; and provision a VNF including at least one of the V-AUSF, the V-AF, the V-AMF, or the V-SMF, based on the received instance response, wherein the at least one VNF excluding the provisioned VNF uses an NF of the first core network.

* * * * *